United States Patent
Lin et al.

(10) Patent No.: US 10,215,955 B2
(45) Date of Patent: Feb. 26, 2019

(54) PHOTOGRAPHING OPTICAL LENS SYSTEM, IMAGING APPARATUS AND ELECTRONIC DEVICE

(71) Applicant: LARGAN PRECISION CO., LTD., Taichung (TW)

(72) Inventors: Cheng-Chen Lin, Taichung (TW); Chun-Yen Chen, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/479,616

(22) Filed: Apr. 5, 2017

(65) Prior Publication Data
US 2018/0129021 A1    May 10, 2018

(30) Foreign Application Priority Data

Nov. 9, 2016  (TW) .............................. 105136395 A

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
CPC ... G02B 9/60; G02B 9/62; G02B 9/64; G02B 13/0005
See application file for complete search history.

(56) References Cited

U.S. PATENT DOCUMENTS

| | | | |
|---|---|---|---|
| 8,908,288 B2 | 12/2014 | Hsu et al. | |
| 9,250,420 B2 | 2/2016 | Hsu et al. | |
| 2012/0154929 A1 | 6/2012 | Tsai et al. | |
| 2015/0103225 A1* | 4/2015 | Hsu ................... | G02B 13/0045 348/335 |
| 2015/0103241 A1 | 4/2015 | Lin et al. | |
| 2015/0103242 A1 | 4/2015 | Lin et al. | |
| 2015/0103243 A1 | 4/2015 | Lin et al. | |
| 2016/0195693 A1 | 7/2016 | Tang et al. | |

FOREIGN PATENT DOCUMENTS

| | | |
|---|---|---|
| CN | 105988185 A | 10/2016 |
| TW | 201224571 A1 | 6/2012 |
| TW | 201421063 A | 6/2014 |
| WO | 2016003211 A1 | 1/2016 |

\* cited by examiner

*Primary Examiner* — Darryl J Collins
*Assistant Examiner* — Journey F Sumlar
(74) *Attorney, Agent, or Firm* — Locke Lord LLP; Tim Tingkang Xia, Esq.

(57) ABSTRACT

The present disclosure provides a photographing optical lens system comprising five lens elements, the five lens elements being, in order from an object side to an image side: a first lens element with positive refractive power having an object-side surface being convex in a paraxial region thereof, a second lens element having positive refractive power, a third lens element having negative refractive power, a fourth lens element having positive refractive power, and a fifth lens element with negative refractive power having an image-side surface being concave in a paraxial region thereof with at least one convex critical point in an off-axial region thereof, both of an object-side surface and the image-side surface thereof being aspheric.

21 Claims, 22 Drawing Sheets

PHOTOGRAPHING OPTICAL LENS SYSTEM, IMAGING APPARATUS AND ELECTRONIC DEVICE

RELATED APPLICATIONS

This application claims priority to Taiwan Application Serial Number 105136395, filed on Nov. 9, 2016, which is incorporated by reference herein in its entirety.

BACKGROUND

Technical Field

The present disclosure relates to a photographing optical lens system and an imaging apparatus, and more particularly, to a photographing optical lens system and an imaging apparatus applicable to electronic devices.

Description of Related Art

As electronic products are becoming even smaller, thinner and lighter these years, imaging apparatuses installed in these electronic products need to become more and more compact accordingly. However, most high-quality compact imaging systems available on the market are equipped with very limited angle of views and aperture sizes. As a result, it is hard to photograph a large area or achieve a sufficient depth of field in an image with such a compact imaging system.

On the other hand, as for conventional imaging lens assemblies with relatively large field of views and large apertures, most of them tend to have longer total track lengths and back focal lengths, larger sizes or unsatisfactory image quality, and are therefore difficult for use in portable electronic devices. Most current lens configurations cannot satisfy the need for a large field of view and a short total track length at the same time, or may generate intense stray light that affects the image quality. In view of the above, there exists a need for an optical imaging lens that features a wide field of view and a compact size while achieving high image quality at the same time.

SUMMARY

According to one aspect of the present disclosure, a photographing optical lens system comprises five lens elements, the five lens element being, in order from an object side to an image side: a first lens element with positive refractive power having an object-side surface being convex in a paraxial region thereof; a second lens element having positive refractive power; a third lens element having negative refractive power; a fourth lens element having positive refractive power; and a fifth lens element with negative refractive power having an image-side surface being concave in a paraxial region thereof with at least one convex critical point in an off-axial region thereof, both of an object-side surface and the image-side surface thereof being aspheric. An Abbe number of the fourth lens element is V4, an Abbe number of the fifth lens element is V5, a focal length of the photographing optical lens system is f, a curvature radius of an object-side surface of the second lens element is R3, a curvature radius of an image-side surface of the second lens element is R4, a curvature radius of an image-side surface of the third lens element is R6, a focal length of the first lens element is f1, a focal length of the second lens element is f2, a focal length of the third lens element is f3, a focal length of the fifth lens element is f5, and the following conditions are satisfied:

$1.50 < V4/V5;$ $-3.0 \le f/R6 < 1.33;$ $0.65 < f3/f5 < 6.25;$ $0 < f1/f2 < 1.70;$ and $0 < (R3+R4)/(R3-R4) < 5.5.$ According to yet another aspect of the present disclosure, an imaging apparatus comprises the aforementioned photographing optical lens system and an image sensor.

According to still another aspect of the present disclosure, an electronic device comprises the aforementioned imaging apparatus.

DETAILED DESCRIPTION

Figure 1A:
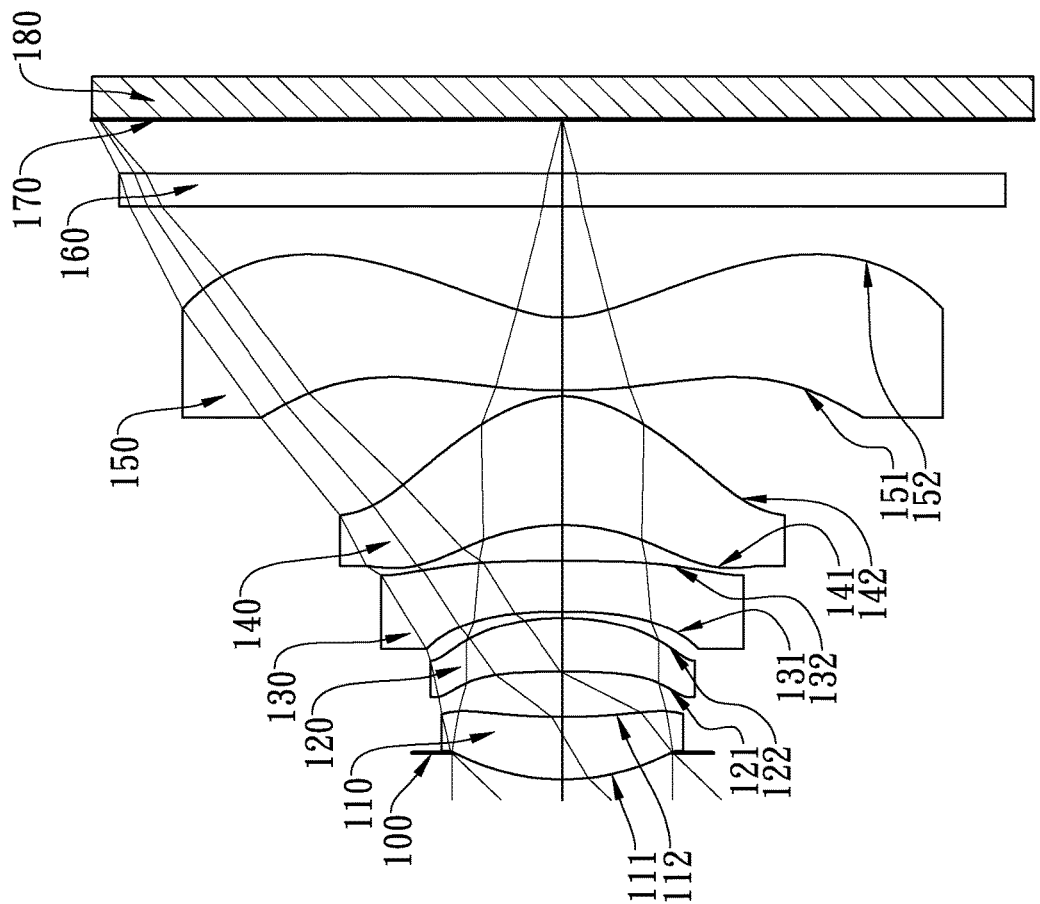
FIG. 1A is a schematic view of an imaging apparatus according to the 1st embodiment of the present disclosure.

The present disclosure provides a photographing optical lens system comprising, from an object side to an image side, a first lens element, a second lens element, a third lens element, a fourth lens element and a fifth lens element, wherein the photographing optical lens system has a total of five lens elements.

The first lens element and the second lens element both have positive refractive power, so that the total track length of the photographing optical lens system can be effectively reduced while achieving a large field of view. Thus, the need for a compact size and a large field of view at the same time can be satisfied.

The first lens element has a convex object-side surface, which is favorable for enhancing the positive refractive power and further improving the miniaturization of the photographing optical lens system accordingly.

The second lens element may have a concave object-side surface and a convex image-side surface. This configuration can help balance aberrations generated by the first lens element to improve image quality, and it is also favorable for aberration corrections.

The third lens element has negative refractive power, which is favorable for moderating convergence of light rays in the off-axis field so as to correct Petzval sum. The third lens element may have an image-side surface being concave in a paraxial region thereof, so that principal points can move toward the image side and the field of view can be favorably enlarged. The third lens element has an image-side surface with at least one convex critical point in an off-axial region thereof, which can help reduce the total track length of the photographing optical lens system and correct off-axis aberrations, and thereby maintain good image quality at the peripheral image field.

The fourth lens element with positive refractive power may have a concave object-side surface and a convex image-side surface to help the convergence of light and image formation.

The fifth lens element with negative refractive power has an image-side surface being concave in a paraxial region thereof with at least one convex critical point in an off-axial region thereof. The fourth lens element and the fifth lens element can facilitate the convergence of light rays on the image surface and thereby achieve a short back focal length while satisfying the need for a compact size.

There is at least one lens element made of glass among the second through fourth lens elements, so that the distribution of refractive power can be arranged with more flexibility.

When an Abbe number of the fourth lens element is V4, an Abbe number of the fifth lens element is V5, and the following condition is satisfied: 1.50<V4/V5, a better balance between chromatic aberration and astigmatism can be achieved, and also, it is favorable for making full use of the materials suitable for manufacturing lens elements. Preferably, the following condition is satisfied: 2.0<V4/V5<3.5.

When a focal length of the photographing optical lens system is f, a curvature radius of the image-side surface of the third lens element is R6, and the following condition is satisfied: −3.0<f/R6<1.33, the image-side surface of the third lens element can have a more moderate peripheral shape, which is favorable for preventing surface reflections and stray light due to an excessively large slope in the peripheral region, and image quality can be improved accordingly. Preferably, the following condition is satisfied: −1.0<f/R6<0.50.

When a focal length of the third lens element is f3, a focal length of the fifth lens element is f5, and the following condition is satisfied: 0.65<f3/f5<6.25, it can prevent the refractive power of the third lens element from becoming too low, so that the third lens element can still correct aberrations generated by the first lens element and the second lens element; also, it can prevent the refractive power of the third lens element from becoming too high, so that the sensitivity in the manufacturing tolerance can be reduced, and a balance between image quality and lens manufacturing can be favorably achieved. Preferably, the following condition is satisfied: 1.0<f3/f5<4.5.

When a focal length of the first lens element is f1, a focal length of the second lens element is f2, and the following condition is satisfied: 0<f1/f2<1.70, it can prevent the refractive power of the first lens element from becoming too low and the overall shape of the first lens element from becoming overly curved, so that surface reflections and stray light can be avoided. Preferably, the following condition is satisfied: 0<f1/f2<1.25.

When a curvature radius of the object-side surface of the second lens element is R3, a curvature radius of the image-side surface of the second lens element is R4, and the following condition is satisfied: 0<(R3+R4)/(R3−R4)<5.5, the second lens element can have a more appropriate shape to fit with the first lens element, which is favorable for offsetting aberrations generated by the first lens element when a large field of view is intended. Preferably, the following condition is satisfied: 1.0<(R3+R4)/(R3−R4)<5.5. Preferably, the following condition is satisfied: 1.30<(R3+R4)/(R3−R4)<5.0.

When the focal length of the photographing optical lens system is f, the focal length of the first lens element is f1, the focal length of the second lens element is f2, and the following condition is satisfied: 1.00<(f/f1)+(f/f2)<1.75, it can reduce the total track length effectively and prevent the refractive power at the object side from becoming too high, so that aberrations can be reduced favorably.

When a curvature radius of the object-side surface of the fourth lens element is R7, a curvature radius of the image-side surface of the fourth lens element is R8, and the following condition is satisfied: 0.40<|R7+R8|/f<1.25, the shape of the fourth lens element can be properly controlled, which is favorable for the convergence of peripheral light rays and the control of image distortion.

When an axial distance between the second lens element and the third lens element is T23, a central thickness of the third lens element is CT3, and the following condition is satisfied: T23/CT3<0.33, the thickness of the third lens element and the spacing between the second lens element and the third lens element can be properly adjusted, so that aberrations generated by the first lens element and the second lens element can be corrected favorably.

When a curvature radius of the object-side surface of the first lens element is R1, the curvature radius of the image-side surface of the second lens element is R4, and the following condition is satisfied: −0.25<(R1+R4)/(R1−R4)<0.25, the total track length of the photographing optical lens system can be further reduced.

When an axial distance between the first lens element and the second lens element is T12, an axial distance between the third lens element and the fourth lens element is T34, and the following condition is satisfied: 0<T12/T34<3.0, a proper balance between reducing the total track length and acquiring a large field of view can be achieved. Preferably, the following condition is satisfied: 0.20<T12/T34<2.0.

When half of a maximum field of view of the photographing optical lens system is HFOV, and the following condition is satisfied: 0.50<1/tan(HFOV)<1.15, the field of view can be effectively increased and the photographing optical lens system can be applied to a wider variety of products.

When the focal length of the photographing optical lens system is f, a maximum effective radius of the image-side surface of the fifth lens element is SD52, and the following condition is satisfied: 0.75<f/SD52<1.25, peripheral light entering the photographing optical lens system can be increased and vignetting avoided.

According to the photographing optical lens system of the present disclosure, the lens elements thereof can be made of glass or plastic. When the lens elements are made of glass, the distribution of the refractive power of the photographing optical lens system is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements. Thus, the total track length of the photographing optical lens system can be effectively reduced.

According to the photographing optical lens system of the present disclosure, the photographing optical lens system can include at least one stop, such as an aperture stop, a glare stop or a field stop, so as to favorably reduce the stray light to improve the image quality.

According to the photographing optical lens system of the present disclosure, a stop can be configured as a front stop or a middle stop. A front stop disposed between an imaged object and the first lens element can provide a longer distance between an exit pupil and the image surface, so that the generated telecentric effect can improve the image-sensing efficiency of an image sensor, such as a CCD or CMOS sensor. A middle stop disposed between the first lens element and the image surface is favorable for enlarging the field of view, thereby providing the photographing optical lens system with the advantages of a wide-angle lens.

According to the photographing optical lens system of the present disclosure, when a lens element has a convex surface and the region of convex shape is not specified, it indicates that the surface can be convex in the paraxial region thereof; when the lens element has a concave surface and the region of concave shape is not specified, it indicates that the surface can be concave in the paraxial region thereof. Likewise, when the region of refractive power or focal length of a lens element is not specified, it indicates that the region of refractive power or focal length of the lens element can be in the paraxial region thereof.

According to the photographing optical lens system of the present disclosure, the image surface of the photographing optical lens system, based on the corresponding image sensor, can be a planar or curved surface with any curvature, especially a curved surface being concave facing towards the object side.

The photographing optical lens system of the present disclosure can be optionally applied to moving-focus optical systems. The photographing optical lens system of the present disclosure features good correction capability and high image quality, and can be applied to 3D (three-dimensional) image capturing applications and electronic devices, such as digital cameras, mobile devices, smartphones, digital tablets, smart TVs, network surveillance devices, motion sensing input devices, driving recording systems, rear view camera systems, drone cameras and wearable devices.

The present disclosure further provides an imaging apparatus comprising the aforementioned photographing optical lens system and an image sensor, wherein the image sensor is disposed on or near an image surface of the photographing optical lens system. Therefore, the design of the photographing optical lens system enables the imaging apparatus to achieve high image quality. Preferably, the photographing optical lens system can further comprise a barrel member, a holding member or a combination thereof.

Figure 9A:
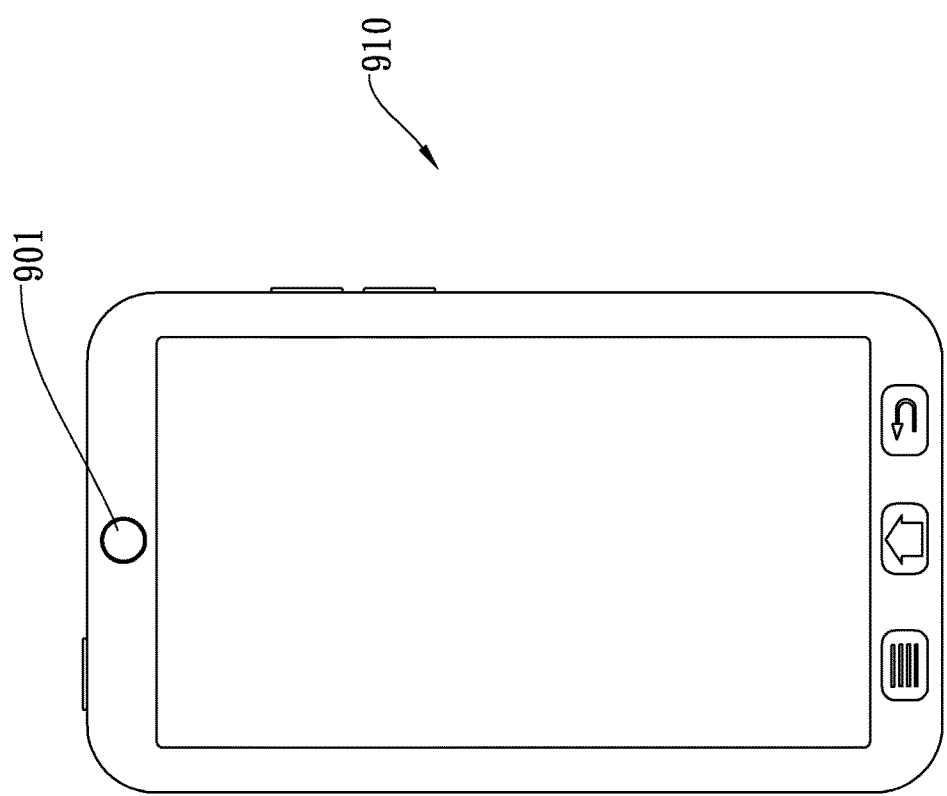
FIG. 9A shows a smartphone with an imaging apparatus of the present disclosure installed therein.
Figure 9B:
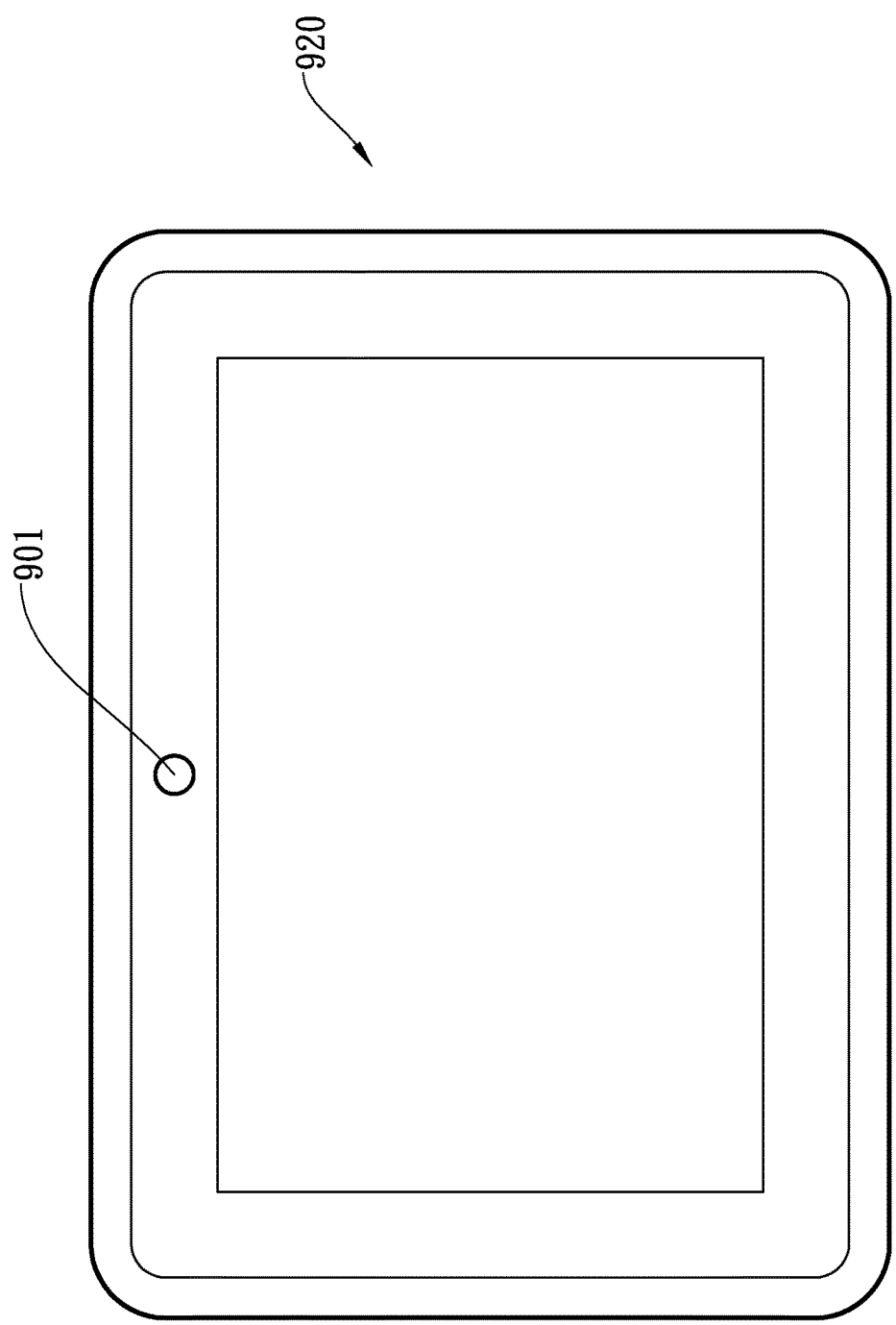
FIG. 9B shows a tablet personal computer with an imaging apparatus of the present disclosure installed therein.
Figure 9C:
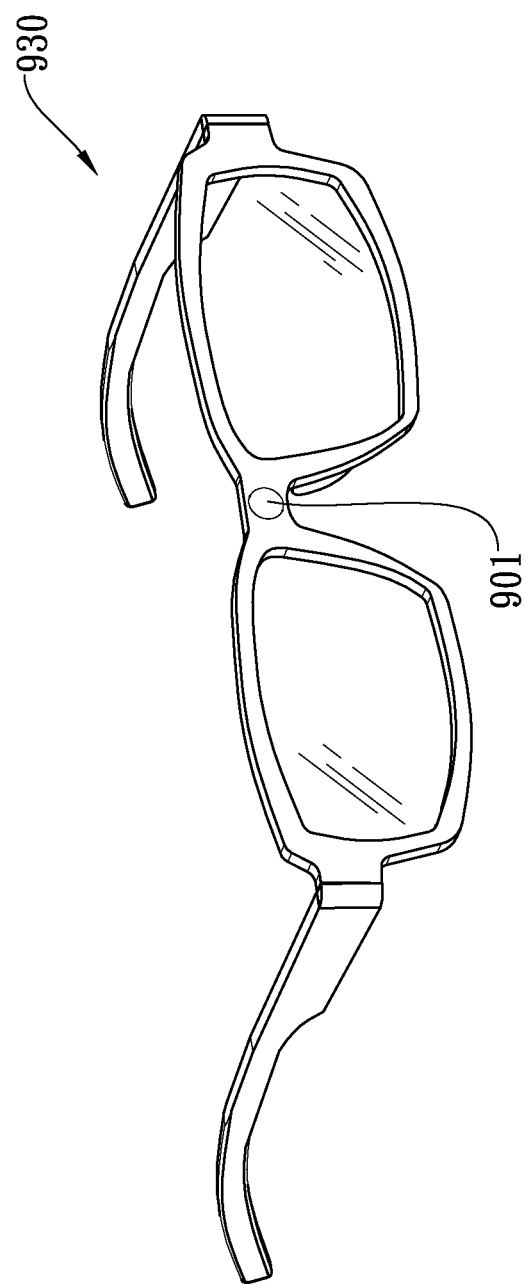
FIG. 9C shows a wearable device with an imaging apparatus of the present disclosure installed therein.

Referring to FIG. 9A, FIG. 9B, and FIG. 9C, an imaging apparatus 901 may be installed in a mobile device including, a smartphone 910, a tablet personal computer 920, or a wearable device 930. The three exemplary figures of different mobile devices are only exemplary for showing the imaging apparatus of the present disclosure installed in a mobile device, and the present disclosure is not limited thereto. Preferably, the mobile device can further comprise a control unit, a display unit, a storage unit, a random access memory unit (RAM) or a combination thereof.

Figure 10A:
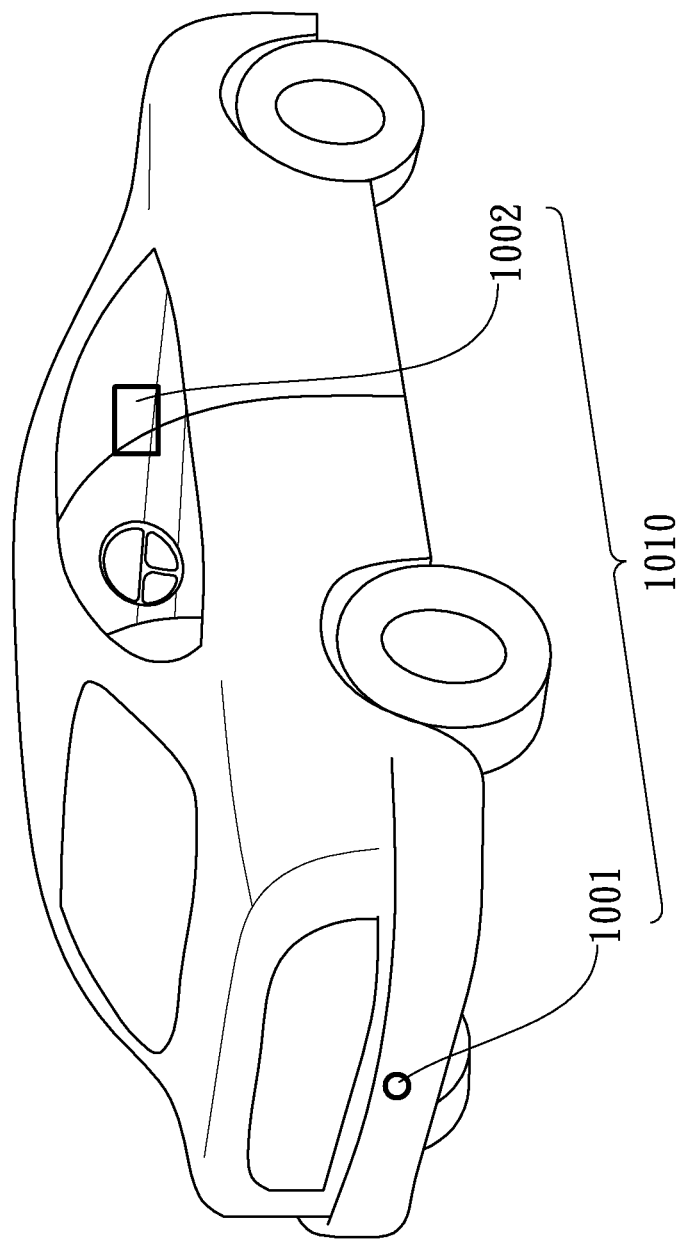
FIG. 10A shows a rear view camera with an imaging apparatus of the present disclosure installed therein.
Figure 10B:
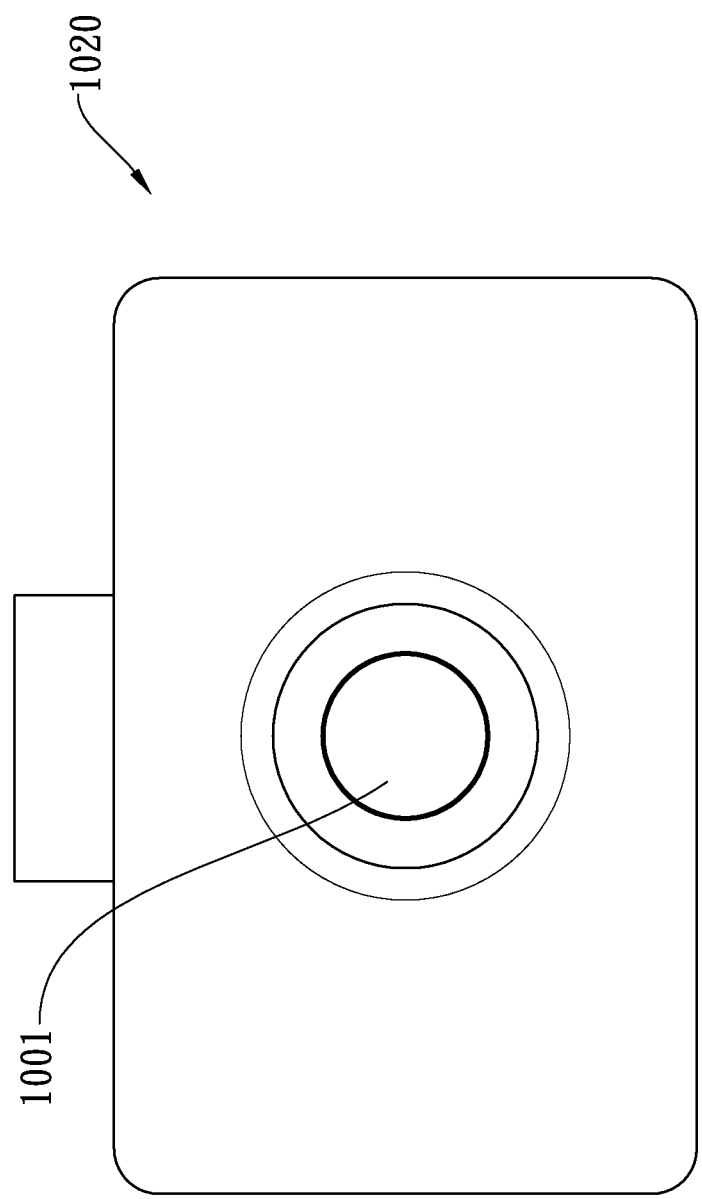
FIG. 10B shows a driving recording system with an imaging apparatus of the present disclosure installed therein.
Figure 10C:
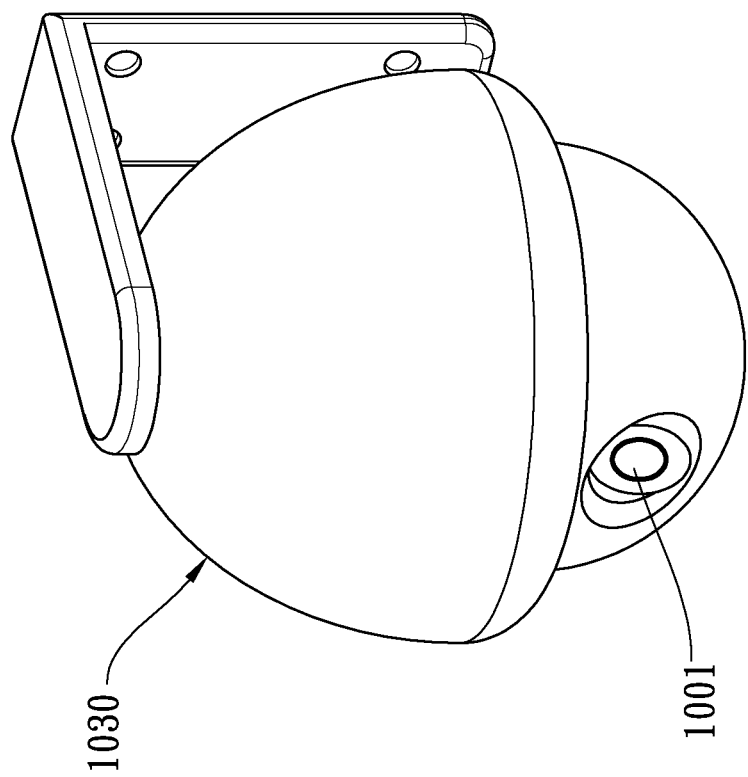
FIG. 10C shows a surveillance camera with an imaging apparatus of the present disclosure installed therein.

Referring to FIG. 10A, FIG. 10B and FIG. 10C, an imaging apparatus 1001 may be installed in an electronic device (may be accompanied with a display screen 1002) such as a rear view camera 1010, a driving recording system 1020, or a surveillance camera 1030. The three exemplary figures of different electronic devices are only exemplary for showing the imaging apparatus of the present disclosure installed in an electronic device, and the present disclosure is not limited thereto. Preferably, the electronic device can further comprise a control unit, a display unit, a storage unit, a random access memory unit (RAM) or a combination thereof.

According to the above description of the present disclosure, the following 1st-8th specific embodiments are provided for further explanation.

1st Embodiment

Figure 1B:
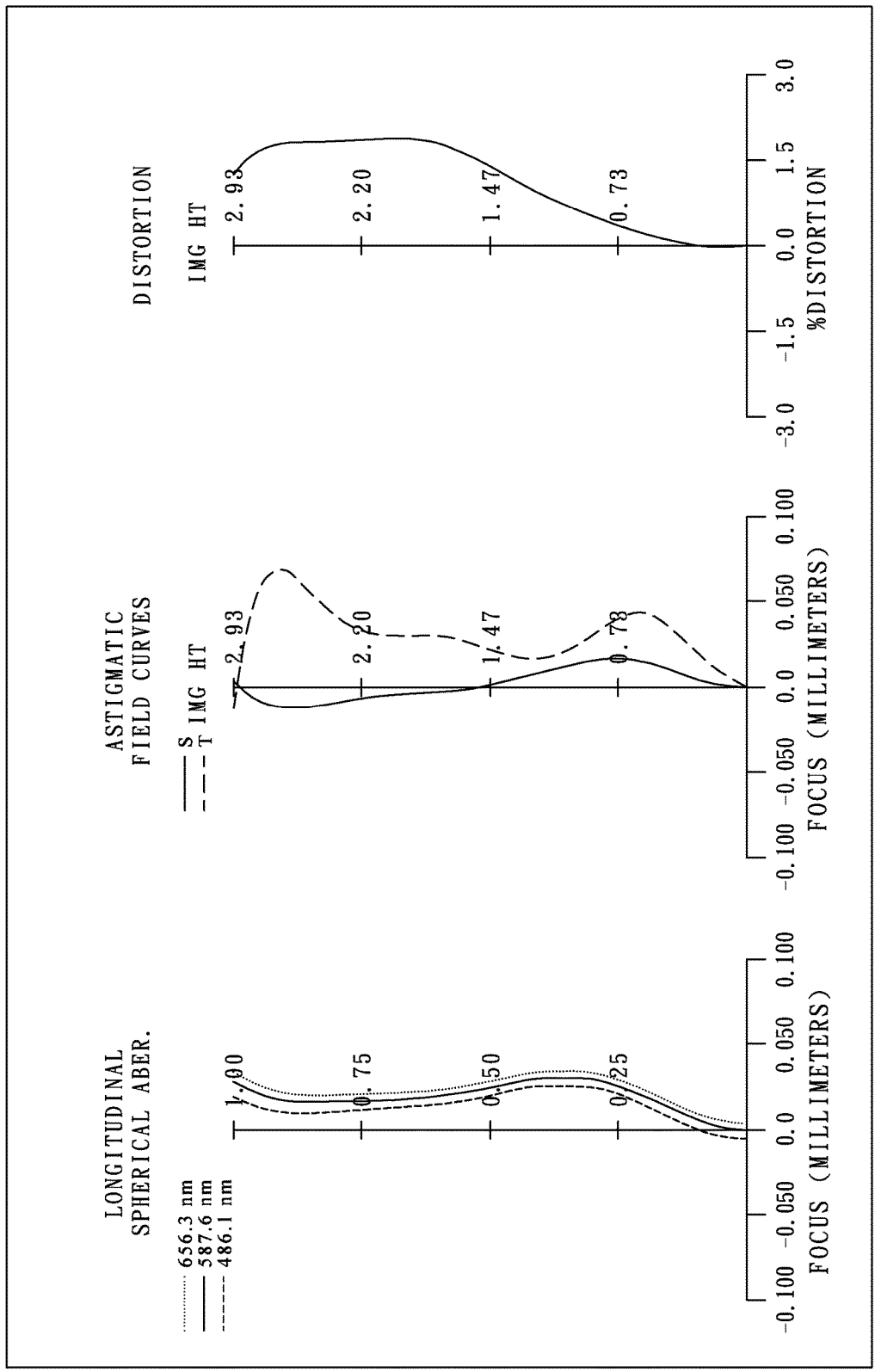
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus comprises a photographing optical lens system (not otherwise herein labeled) of the present disclosure and an image sensor 180. The photographing optical lens system comprises, in order from an object side to an image side, an aperture stop 100, a first lens element 110, a second lens element 120, a third lens element 130, a fourth lens element 140, a fifth lens element 150, an IR-cut filter 160 and an image surface 170, wherein the photographing optical lens system has a total of five lens elements (110, 120, 130, 140, 150).

The first lens element 110 has positive refractive power in a paraxial region thereof and is made of plastic. The first lens element 110 has an object-side surface 111 being convex in a paraxial region thereof and an image-side surface 112 being concave in a paraxial region thereof, which are both aspheric.

The second lens element 120 has positive refractive power in a paraxial region thereof and is made of plastic. The second lens element 120 has an object-side surface 121 being concave in a paraxial region thereof and an image-side surface 122 being convex in a paraxial region thereof, which are both aspheric.

The third lens element 130 has negative refractive power in a paraxial region thereof and is made of plastic. The third lens element 130 has an object-side surface 131 being concave in a paraxial region thereof and an image-side surface 132 being planar in a paraxial region thereof, which are both aspheric.

The fourth lens element 140 has positive refractive power in a paraxial region thereof and is made of plastic. The fourth lens element 140 has an object-side surface 141 being concave in a paraxial region thereof and an image-side surface 142 being convex in a paraxial region thereof, which are both aspheric.

The fifth lens element 150 has negative refractive power in a paraxial region thereof and is made of plastic. The fifth lens element 150 has an object-side surface 151 being convex in a paraxial region thereof and an image-side surface 152 being concave in a paraxial region thereof with at least one convex critical point in an off-axial region thereof, both of the object-side surface 151 and the image-side surface 152 being aspheric.

The photographing optical lens system further comprises an IR-cut filter 160 located between the fifth lens element 150 and the image surface 170. The IR-cut filter 160 is made of glass and does not affect the focal length of the photographing optical lens system. The image sensor 180 is disposed on or near the image surface 170.

The detailed optical data of the 1st embodiment are shown in TABLE 1, wherein the units of the curvature radius, the thickness and the focal length are expressed in mm. Moreover, HFOV is half of a maximum field of view, and surfaces #0 to #16 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 2.79 mm, Fno = 2.00, HFOV = 45.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.168 | | | | |
| 2 | Lens 1 | 1.459 | ASP | 0.394 | Plastic | 1.545 | 56.0 | 4.17 |
| 3 | | 3.699 | ASP | 0.288 | | | | |
| 4 | Lens 2 | −6.096 | ASP | 0.339 | Plastic | 1.544 | 55.9 | 4.47 |
| 5 | | −1.771 | ASP | 0.042 | | | | |
| 6 | Lens 3 | −4.224 | ASP | 0.320 | Plastic | 1.660 | 20.4 | −6.40 |
| 7 | | ∞ | ASP | 0.227 | | | | |
| 8 | Lens 4 | −1.436 | ASP | 0.814 | Plastic | 1.559 | 40.4 | 1.42 |
| 9 | | −0.615 | ASP | 0.035 | | | | |
| 10 | Lens 5 | 3.645 | ASP | 0.465 | Plastic | 1.614 | 26.0 | −1.50 |
| 11 | | 0.699 | ASP | 0.700 | | | | |
| 12 | IR-filter | Plano | | 0.210 | Glass | 1.517 | 64.2 | — |
| 13 | | Plano | | 0.339 | | | | |
| 14 | Image | Plano | | — | | | | |

Note:
Reference wavelength is d-line 587.6 nm.

TABLE 2

Aspheric Coefficients

| Surface # | 2 | 3 | 4 | 5 | 6 |
|---|---|---|---|---|---|
| k = | 2.8980E−01 | −2.7421E+01 | 1.8522E+01 | −3.7557E+01 | −3.4667E+00 |
| A4 = | −1.9220E−02 | 5.3533E−02 | −1.6730E−01 | −1.0218E+00 | −4.1348E−01 |
| A6 = | 1.4884E−01 | −3.8619E−01 | −2.7004E−01 | 2.4336E+00 | 5.5888E−01 |
| A8 = | −8.3338E−01 | 1.0182E+00 | −1.8739E+00 | −5.3482E+00 | −1.4416E−01 |
| A10 = | 1.7310E+00 | −2.8559E+00 | 1.5237E+01 | 8.4944E+00 | −2.3618E+00 |
| A12 = | −1.6128E+00 | 2.5676E+00 | −5.5890E+01 | −1.2297E+01 | 4.3391E+00 |
| A14 = | | −6.0195E−01 | 8.9817E+01 | 1.3494E+01 | −2.4650E+00 |
| A16 = | | | −4.9761E+01 | −5.4809E+00 | |

| Surface # | 7 | 8 | 9 | 10 | 11 |
|---|---|---|---|---|---|
| k = | −1.0000E+00 | −3.5967E+00 | −3.3415E+00 | 1.0731E+00 | −6.0671E+00 |
| A4 = | −2.6210E−01 | −3.2999E−01 | −2.9703E−01 | −4.2583E−02 | −2.9621E−02 |

TABLE 2-continued

Aspheric Coefficients

| A6 = | 5.2753E−01 | 6.0831E−01 | 3.3527E−01 | −2.8212E−02 | −2.4451E−03 |
|---|---|---|---|---|---|
| A8 = | −8.1134E−01 | −5.6504E−01 | −2.9458E−01 | 1.3663E−02 | 2.7061E−03 |
| A10 = | 7.6479E−01 | 6.7543E−01 | 2.0953E−01 | −3.1681E−03 | −9.8673E−04 |
| A12 = | −3.6660E−01 | −5.9158E−01 | −7.4724E−02 | 4.3482E−04 | 1.9064E−04 |
| A14 = | 6.9962E−02 | 2.5532E−01 | 9.6869E−03 | −2.8111E−05 | −1.8813E−05 |
| A16 = | | −4.1946E−02 | | | 6.9575E−07 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the photographing optical lens system is f, an f-number of the photographing optical lens system is Fno, half of a maximum field of view of the photographing optical lens system is HFOV, and these parameters have the following values: f=2.79 mm, Fno=2.00, HFOV=45.9 degrees, and 1/tan(HFOV)=0.97.

In the 1st embodiment, an Abbe number of the fourth lens element 140 is V4, an Abbe number of the fifth lens element 150 is V5, and they satisfy the condition: V4/V5=1.55.

In the 1st embodiment, an axial distance between the first lens element 110 and the second lens element 120 is T12, an axial distance between the third lens element 130 and the fourth lens element 140 is T34, and they satisfy the condition: T12/T34=1.27.

In the 1st embodiment, an axial distance between the second lens element 120 and the third lens element 130 is T23, a central thickness of the third lens element 130 is CT3, and they satisfy the condition: T23/CT3=0.13.

In the 1st embodiment, a curvature radius of the object-side surface 111 of the first lens element 110 is R1, a curvature radius of the image-side surface 122 of the second lens element 120 is R4, and they satisfy the condition: (R1+R4)/(R1−R4)=−0.10.

In the 1st embodiment, a curvature radius of the object-side surface 121 of the second lens element 120 is R3, the curvature radius of the image-side surface 122 of the second lens element 120 is R4, and they satisfy the condition:

(R3+R4)/(R3−R4)=1.82.

In the 1st embodiment, a curvature radius of the object-side surface 141 of the fourth lens element 140 is R7, a curvature radius of the image-side surface 142 of the fourth lens element 140 is R8, the focal length of the photographing optical lens system is f, and they satisfy the condition: |R7+R8|/f=0.73.

In the 1st embodiment, the focal length of the photographing optical lens system is f, a curvature radius of the image-side surface 132 of the third lens element 130 is R6, and they satisfy the condition: f/R6=0.00.

In the 1st embodiment, the focal length of the photographing optical lens system is f, a maximum effective radius of the image-side surface 152 of the fifth lens element 150 is SD52, and they satisfy the condition: f/SD52=1.16.

In the 1st embodiment, a focal length of the first lens element 110 in a paraxial region thereof is f1, a focal length of the second lens element 120 in a paraxial region thereof is f2, and they satisfy the condition: f1/f2=0.93.

In the 1st embodiment, a focal length of the third lens element 130 in a paraxial region thereof is f3, a focal length of the fifth lens element 150 in a paraxial region thereof is f5, and they satisfy the condition: f3/f5=4.27.

In the 1st embodiment, the focal length of the photographing optical lens system is f, the focal length of the first lens element 110 in a paraxial region thereof is f1, the focal length of the second lens element 120 in a paraxial region thereof is f2, and they satisfy the condition: (f/f1)+(f/f2)=1.29.

2nd Embodiment

Figure 2A:
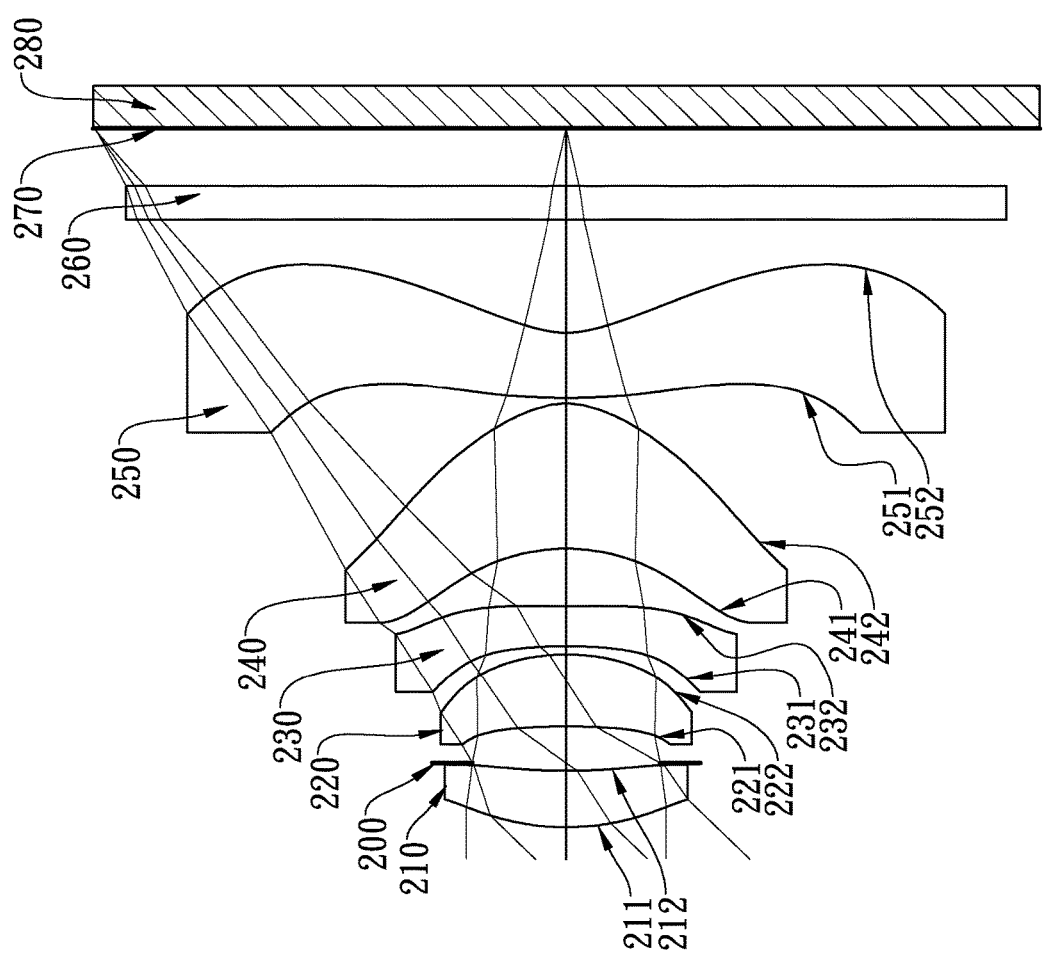
FIG. 2A is a schematic view of an imaging apparatus according to the 2nd embodiment of the present disclosure.
Figure 2B:
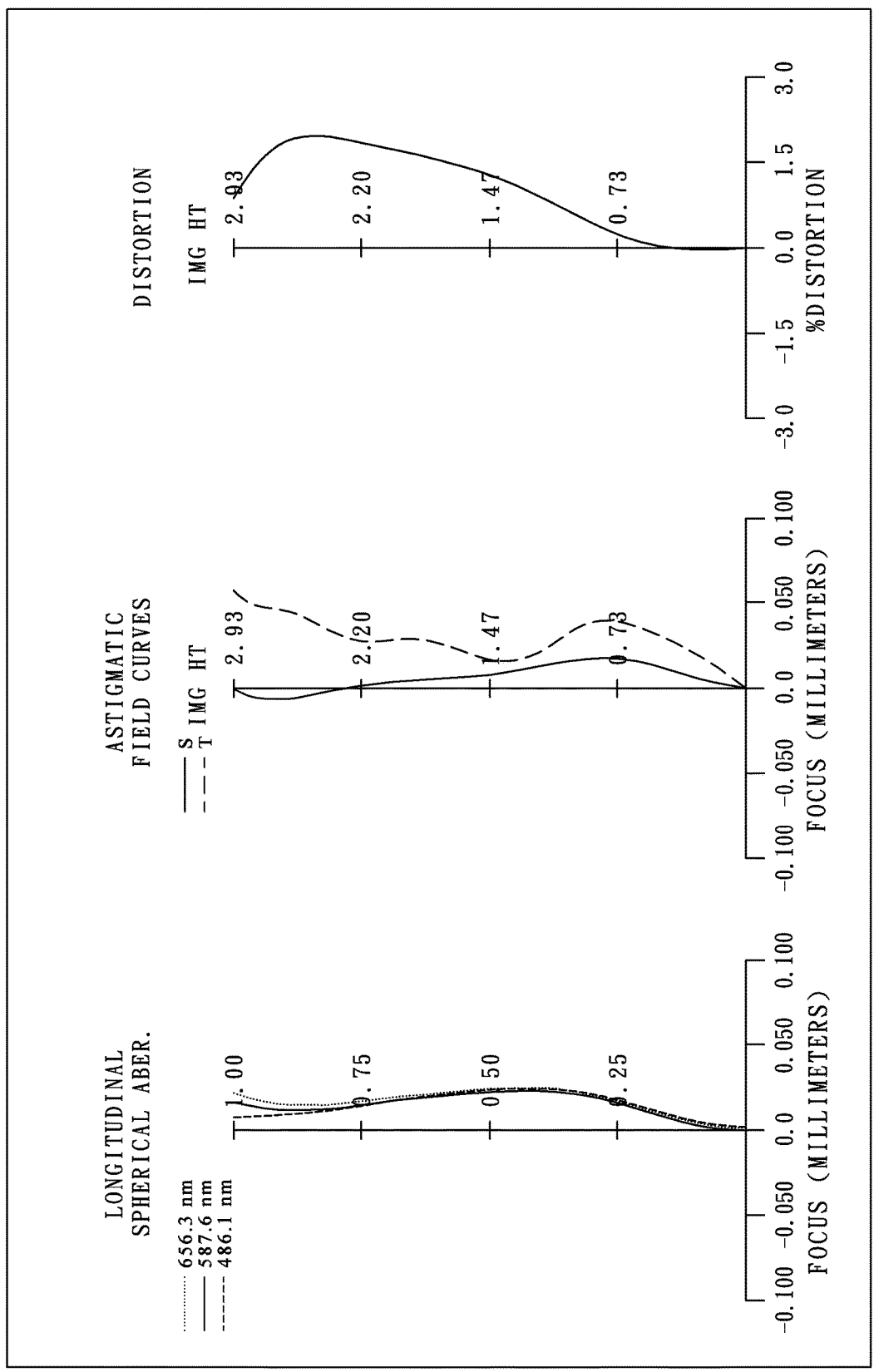
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus comprises a photographing optical lens system (not otherwise herein labeled) of the present disclosure and an image sensor 280. The photographing optical lens system comprises, in order from an object side to an image side, a first lens element 210, an aperture stop 200, a second lens element 220, a third lens element 230, a fourth lens element 240, a fifth lens element 250, an IR-cut filter 260 and an image surface 270, wherein the photographing optical lens system has a total of five lens elements (210, 220, 230, 240, 250).

The first lens element 210 has positive refractive power in a paraxial region thereof and is made of plastic. The first lens element 210 has an object-side surface 211 being convex in a paraxial region thereof and an image-side surface 212 being concave in a paraxial region thereof, which are both aspheric.

The second lens element 220 has positive refractive power in a paraxial region thereof and is made of plastic. The second lens element 220 has an object-side surface 221 being concave in a paraxial region thereof and an image-side surface 222 being convex in a paraxial region thereof, which are both aspheric.

The third lens element 230 has negative refractive power in a paraxial region thereof and is made of plastic. The third lens element 230 has an object-side surface 231 being concave in a paraxial region thereof and an image-side surface 232 being concave in a paraxial region thereof with at least one convex critical point in an off-axial region thereof, both of the object-side surface 231 and the image-side surface 232 being aspheric.

The fourth lens element 240 has positive refractive power in a paraxial region thereof and is made of plastic. The fourth lens element 240 has an object-side surface 241 being concave in a paraxial region thereof and an image-side surface 242 being convex in a paraxial region thereof, which are both aspheric.

The fifth lens element 250 has negative refractive power in a paraxial region thereof and is made of plastic. The fifth lens element 250 has an object-side surface 251 being convex in a paraxial region thereof and an image-side surface 252 being concave in a paraxial region thereof with at least one convex critical point in an off-axial region thereof, both of the object-side surface 251 and the image-side surface 252 being aspheric.

The photographing optical lens system further comprises an IR-cut filter 260 located between the fifth lens element 250 and the image surface 270. The IR-cut filter 260 is made of glass and does not affect the focal length of the photographing optical lens system. The image sensor 280 is disposed on or near the image surface 270.

The detailed optical data of the 2nd embodiment are shown in TABLE 3, wherein the units of the curvature radius, the thickness and the focal length are expressed in mm, HFOV is half of the maximum field of view, and surfaces #0 to #16 refer to the surfaces in order from the object side to the image side. The aspheric surface data of the 2nd embodiment are shown in TABLE 4, wherein k is the conic coefficient in the equation of the aspheric surface profiles, and A4-A16 refer to the 4th to 16th order aspheric coefficients.

TABLE 3

(2nd Embodiment)
f = 2.80 mm, Fno = 2.25, HFOV = 46.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.563 | ASP | 0.350 | Plastic | 1.545 | 56.1 | 4.77 |
| 2 |  | 3.607 | ASP | 0.050 |  |  |  |  |
| 3 | Ape. Stop | Plano |  | 0.226 |  |  |  |  |
| 4 | Lens 2 | -4.762 | ASP | 0.451 | Plastic | 1.544 | 56.0 | 3.23 |
| 5 |  | -1.328 | ASP | 0.050 |  |  |  |  |
| 6 | Lens 3 | -4.470 | ASP | 0.250 | Plastic | 1.671 | 19.5 | -5.13 |
| 7 |  | 15.249 | ASP | 0.357 |  |  |  |  |
| 8 | Lens 4 | -1.272 | ASP | 0.902 | Plastic | 1.559 | 40.4 | 1.12 |
| 9 |  | -0.526 | ASP | 0.035 |  |  |  |  |
| 10 | Lens 5 | 4.142 | ASP | 0.409 | Plastic | 1.607 | 26.6 | -1.20 |
| 11 |  | 0.595 | ASP | 0.700 |  |  |  |  |
| 12 | IR-filter | Plano |  | 0.210 | Glass | 1.517 | 64.2 |  |
| 13 |  | Plano |  | 0.359 |  |  |  |  |
| 14 | Image | Plano |  | — |  |  |  |  |

Note:
Reference wavelength is d-line 587.6 nm.

TABLE 4

Aspheric Coefficients

| Surface # | 1 | 2 | 4 | 5 | 6 |
|---|---|---|---|---|---|
| k = | 2.2056E+00 | -4.1281E+01 | 1.6945E+01 | -5.0000E+00 | -6.6013E+01 |
| A4 = | -8.7848E-02 | 8.9206E-02 | -9.5062E-02 | -3.4770E-01 | -5.3902E-01 |
| A6 = | 8.1522E-02 | -3.9086E-01 | -3.6127E-01 | -8.8415E-01 | 4.3791E-01 |
| A8 = | -8.1568E-01 | 6.9179E-01 | -1.5223E+00 | 7.6881E+00 | -7.5301E-01 |
| A10 = | 1.4154E+00 | -2.4861E+00 | 1.3377E+01 | -3.6162E+01 | -1.4769E+00 |
| A12 = | -1.6167E+00 | 2.5548E+00 | -5.5904E+01 | 8.6153E+01 | 4.3285E+00 |
| A14 = |  | -6.0195E-01 | 8.9817E+01 | -1.0542E+02 | -2.4649E+00 |
| A16 = |  |  | -4.9761E+01 | 5.2638E+01 |  |

| Surface # | 7 | 8 | 9 | 10 | 11 |
|---|---|---|---|---|---|
| k = | -1.0000E+00 | -1.4317E+00 | -3.4669E+00 | 1.2123E+00 | -6.3072E+00 |
| A4 = | -3.5204E-01 | -2.4813E-01 | -4.2148E-01 | 2.5046E-02 | 2.1850E-03 |
| A6 = | 3.9203E-01 | 5.4004E-01 | 6.3465E-01 | -1.0780E-01 | -3.7870E-02 |
| A8 = | -7.1113E-01 | -1.4327E+00 | -8.4191E-01 | 6.1203E-02 | 2.1651E-02 |
| A10 = | 7.5602E-01 | 2.5088E+00 | 6.6496E-01 | -1.7362E-02 | -6.6967E-03 |
| A12 = | -3.4397E-01 | -2.2216E+00 | -2.5745E-01 | 2.1858E-03 | 1.1938E-03 |
| A14 = | 6.6407E-02 | 9.8525E-01 | 3.8461E-02 | -7.9037E-05 | -1.1620E-04 |
| A16 = |  | -1.7597E-01 |  |  | 4.7610E-06 |

In the 2nd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 2nd embodiment are as specified below.

| 2nd Embodiment | | | |
|---|---|---|---|
| f [mm] | 2.79 | (R3 + R4)/(R3 − R4) | 1.82 |
| Fno | 2.00 | \|R7 + R8\|/f | 0.73 |
| HFOV [deg.] | 45.9 | f/R6 | 0.00 |
| 1/tan(HFOV) | 0.97 | f/SD52 | 1.16 |
| V4/V5 | 1.55 | f1/f2 | 0.93 |
| T12/T34 | 1.27 | f3/f5 | 4.27 |
| T23/CT3 | 0.13 | (f/f1) + (f/f2) | 1.29 |
| (R1 + R4)/(R1 − R4) | −0.10 | | |

3rd Embodiment

Figure 3A:
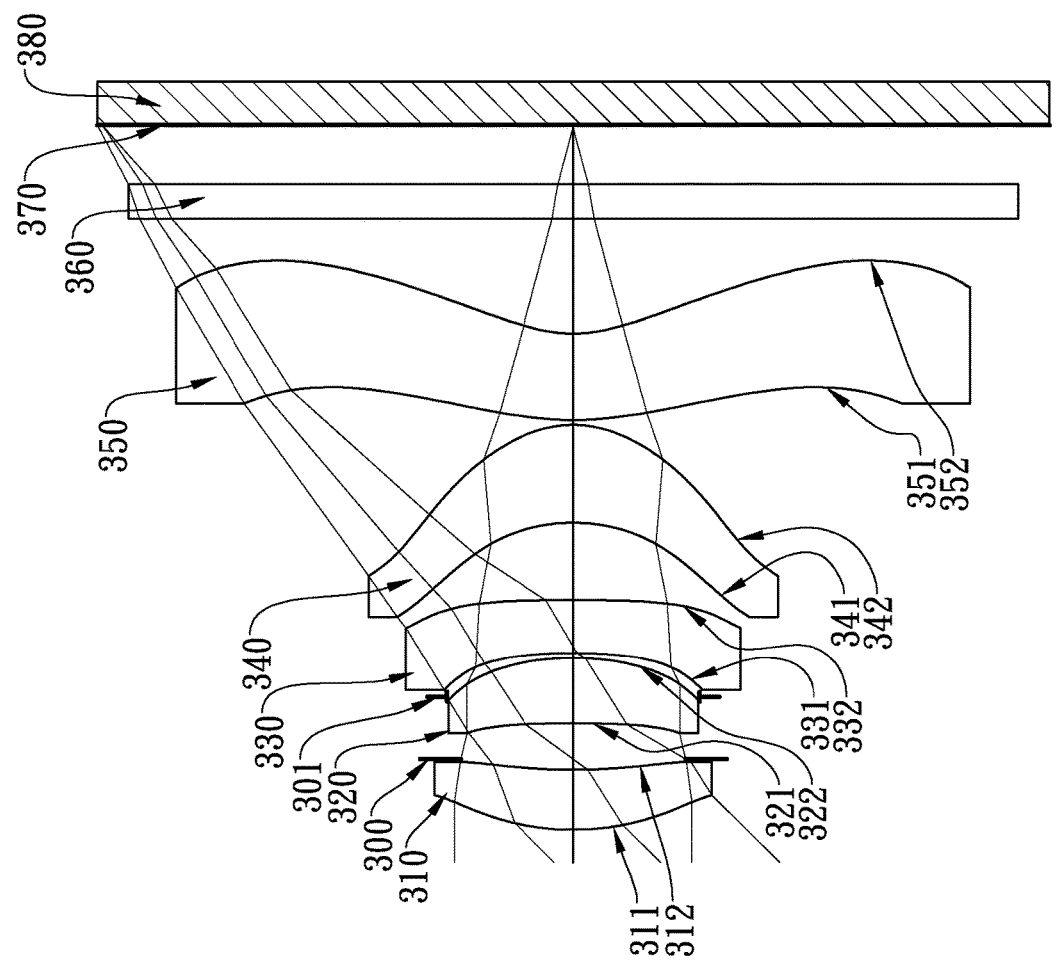
FIG. 3A is a schematic view of an imaging apparatus according to the 3rd embodiment of the present disclosure.
Figure 3B:
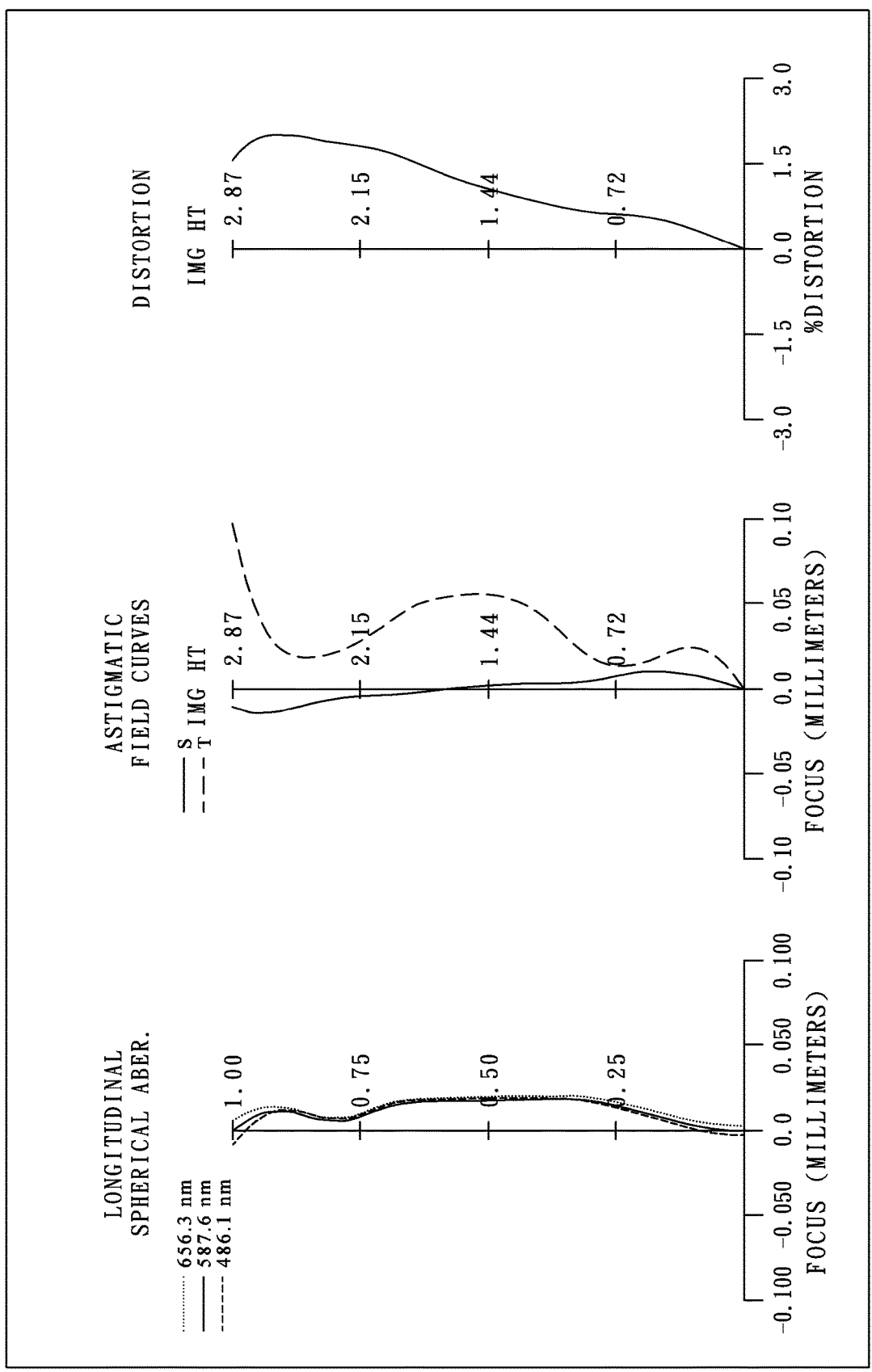
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus comprises a photographing optical lens system (not otherwise herein labeled) of the present disclosure and an image sensor 380. The photographing optical lens system comprises, in order from an object side to an image side, a first lens element 310, an aperture stop 300, a second lens element 320, a stop 301, a third lens element 330, a fourth lens element 340, a fifth lens element 350, an IR-cut filter 360 and an image surface 370, wherein the photographing optical lens system has a total of five lens elements (310, 320, 330, 340, 350).

The first lens element 310 has positive refractive power in a paraxial region thereof and is made of plastic. The first lens element 310 has an object-side surface 311 being convex in a paraxial region thereof and an image-side surface 312 being concave in a paraxial region thereof, which are both aspheric.

The second lens element 320 has positive refractive power in a paraxial region thereof and is made of plastic. The second lens element 320 has an object-side surface 321 being concave in a paraxial region thereof and an image-side surface 322 being convex in a paraxial region thereof, which are both aspheric.

The third lens element 330 has negative refractive power in a paraxial region thereof and is made of plastic. The third lens element 330 has an object-side surface 331 being concave in a paraxial region thereof and an image-side surface 332 being convex in a paraxial region thereof, which are both aspheric.

The fourth lens element 340 has positive refractive power in a paraxial region thereof and is made of plastic. The fourth lens element 340 has an object-side surface 341 being concave in a paraxial region thereof and an image-side surface 342 being convex in a paraxial region thereof, which are both aspheric.

The fifth lens element 350 has negative refractive power in a paraxial region thereof and is made of plastic. The fifth lens element 350 has an object-side surface 351 being convex in a paraxial region thereof and an image-side surface 352 being concave in a paraxial region thereof with at least one convex critical point in an off-axial region thereof, both of the object-side surface 351 and the image-side surface 352 being aspheric.

The photographing optical lens system further comprises an IR-cut filter 360 located between the fifth lens element 350 and the image surface 370. The IR-cut filter 360 is made of glass and does not affect the focal length of the photographing optical lens system. The image sensor 380 is disposed on or near the image surface 370.

The detailed optical data of the 3rd embodiment are shown in TABLE 5, wherein the units of the curvature radius, the thickness and the focal length are expressed in mm, HFOV is half of the maximum field of view, and surfaces #0 to #16 refer to the surfaces in order from the object side to the image side. The aspheric surface data of the 3rd embodiment are shown in TABLE 6, wherein k is the conic coefficient in the equation of the aspheric surface profiles, and A4-A16 refer to the 4th to 16th order aspheric coefficients.

TABLE 5

(3rd Embodiment)
f = 2.80 mm, Fno = 1.93, HFOV = 45.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.578 | ASP | 0.365 | Plastic | 1.545 | 56.0 | 4.96 |
| 2 | | 3.490 | ASP | 0.066 | | | | |
| 3 | Ape. Stop | Plano | | 0.218 | | | | |
| 4 | Lens 2 | −7.576 | ASP | 0.400 | Plastic | 1.544 | 55.9 | 4.34 |
| 5 | | −1.833 | ASP | −0.239 | | | | |
| 6 | Stop | Plano | | 0.269 | | | | |
| 7 | Lens 3 | −4.239 | ASP | 0.323 | Plastic | 1.661 | 20.3 | −6.50 |
| 8 | | −342.034 | ASP | 0.473 | | | | |
| 9 | Lens 4 | −1.111 | ASP | 0.597 | Plastic | 1.544 | 55.9 | 2.06 |
| 10 | | −0.664 | ASP | 0.030 | | | | |
| 11 | Lens 5 | 2.032 | ASP | 0.529 | Plastic | 1.639 | 23.3 | −2.54 |
| 12 | | 0.811 | ASP | 0.700 | | | | |
| 13 | IR-filter | Plano | | 0.210 | Glass | 1.517 | 64.2 | — |
| 14 | | Plano | | 0.361 | | | | |
| 15 | Image | Plano | | — | | | | |

Note:
Reference wavelength is d-line 587.6 nm.
The effective radius on surface #6 is 0.770 mm.

TABLE 6

Aspheric Coefficients

| Surface # | 1 | 2 | 4 | 5 | 8 |
|---|---|---|---|---|---|
| k = | 4.4971E−01 | 1.2896E+01 | 5.8949E+01 | 1.4786E−01 | 9.0000E+01 |
| A4 = | −2.8460E−02 | −6.1876E−02 | −1.1178E−01 | −4.3186E−01 | −2.7705E−01 |
| A6 = | 7.9231E−02 | −8.8008E−02 | 6.6149E−01 | 1.8495E+00 | 4.4235E−01 |
| A8 = | −3.8695E−01 | −6.6735E−03 | −5.6265E+00 | −5.0594E+00 | −6.0586E−01 |
| A10 = | 6.9950E−01 | −7.3180E−01 | 2.0012E+01 | 4.8568E+00 | 4.0527E−01 |
| A12 = | −8.6634E−01 | 6.4050E−01 | −3.7162E+01 | −1.4068E+00 | −2.5575E−01 |
| A14 = | 2.5704E−01 | | 2.5859E+01 | | 1.3164E−01 |

| Surface # | 9 | 10 | 11 | 12 |
|---|---|---|---|---|
| k = | −8.8964E−01 | −2.7747E+00 | −5.9041E−01 | −5.4070E+00 |
| A4 = | −2.5496E−01 | −3.9094E−01 | −1.5319E−01 | −5.4467E−02 |
| A6 = | 6.0204E−01 | 1.8963E−01 | 6.7145E−02 | 2.2545E−02 |
| A8 = | −3.1802E+00 | 1.1953E−01 | −1.6222E−02 | −5.6102E−03 |
| A10 = | 8.1944E+00 | −8.1276E−01 | −2.8611E−03 | 2.2083E−04 |
| A12 = | −9.7561E+00 | 1.2100E+00 | 2.5929E−03 | 1.6647E−04 |
| A14 = | 5.5679E+00 | −6.8468E−01 | −5.4925E−04 | −3.0731E−05 |
| A16 = | −1.2371E+00 | 1.3400E−01 | 3.9800E−05 | 1.6325E−06 |

In the 3rd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 3rd embodiment are as specified below.

| 3rd Embodiment | | | |
|---|---|---|---|
| f [mm] | 2.80 | (R3 + R4)/(R3 − R4) | 1.64 |
| Fno | 1.93 | |R7 + R8|/f | 0.63 |
| HFOV [deg.] | 45.2 | f/R6 | −0.01 |
| 1/tan(HFOV) | 0.99 | f/SD52 | 1.16 |
| V4/V5 | 2.40 | f1/f2 | 1.14 |
| T12/T34 | 0.60 | f3/f5 | 2.56 |
| T23/CT3 | 0.09 | (f/f1) + (f/f2) | 1.21 |
| (R1 + R4)/(R1 − R4) | −0.07 | | |

4th Embodiment

Figure 4A:
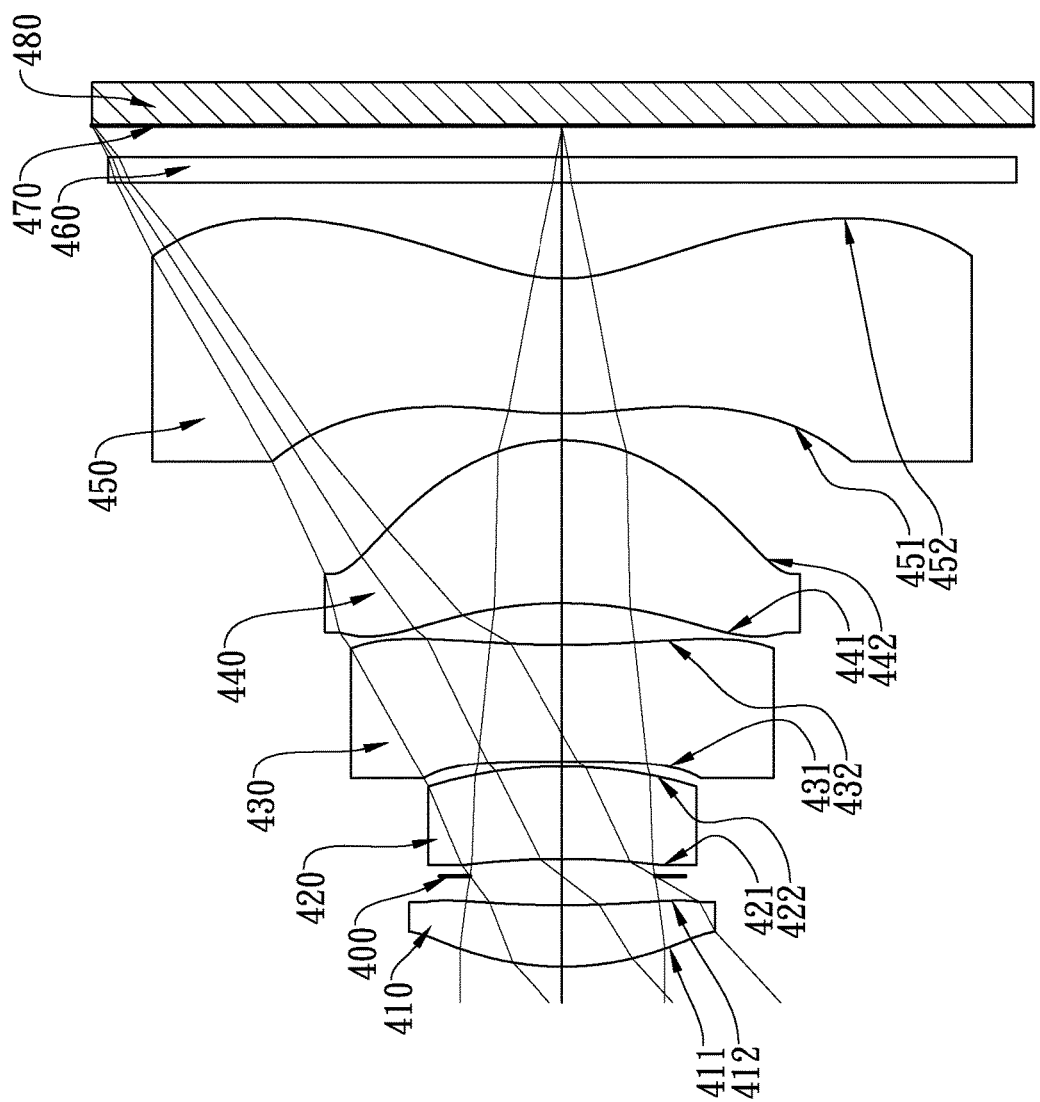
FIG. 4A is a schematic view of an imaging apparatus according to the 4th embodiment of the present disclosure.
Figure 4B:
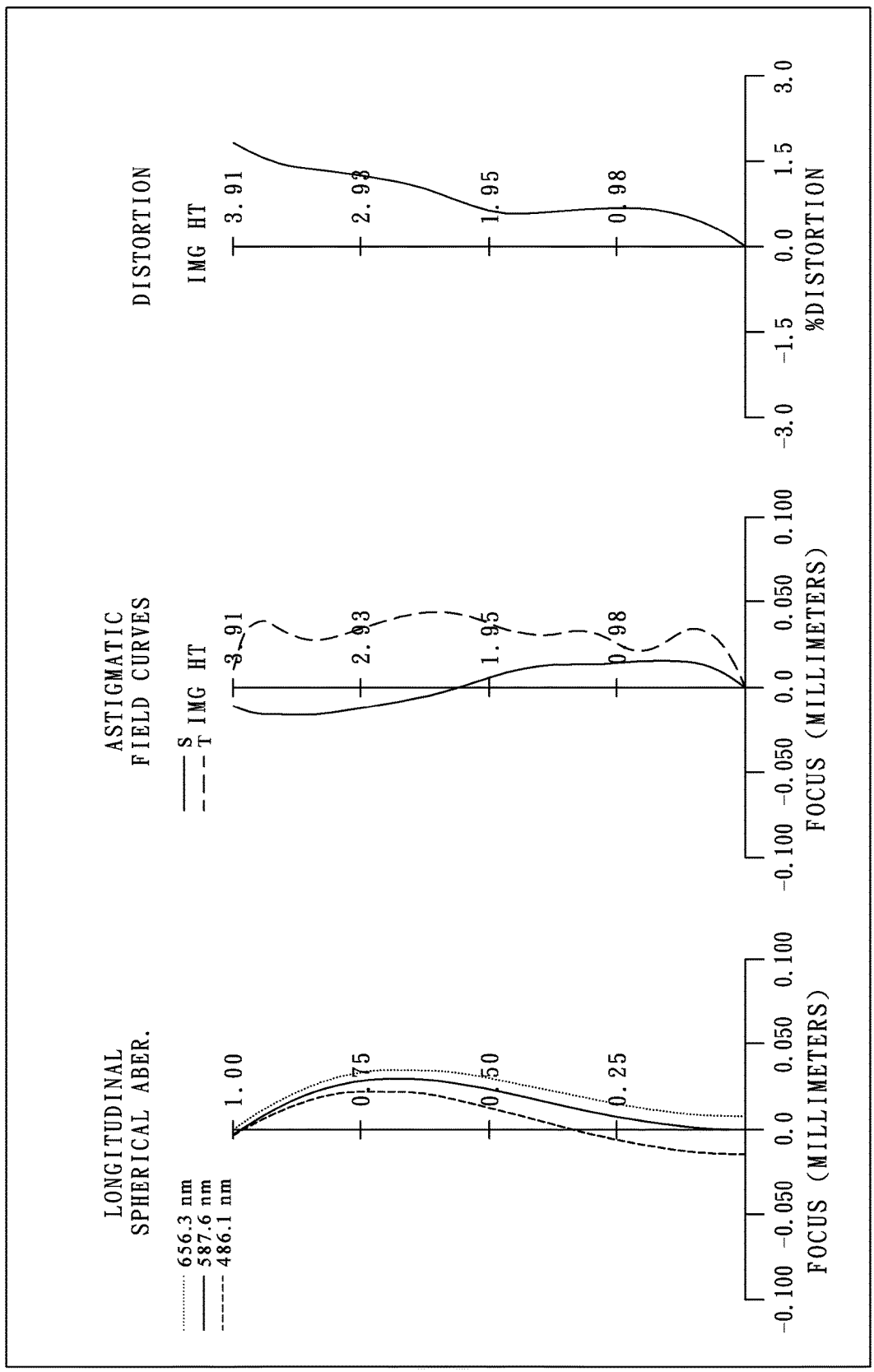
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus comprises a photographing optical lens system (not otherwise herein labeled) of the present disclosure and an image sensor 480. The photographing optical lens system comprises, in order from an object side to an image side, a first lens element 410, an aperture stop 400, a second lens element 420, a third lens element 430, a fourth lens element 440, a fifth lens element 450, an IR-cut filter 460 and an image surface 470, wherein the photographing optical lens system has a total of five lens elements (410, 420, 430, 440, 450).

The first lens element 410 has positive refractive power in a paraxial region thereof and is made of plastic. The first lens element 410 has an object-side surface 411 being convex in a paraxial region thereof and an image-side surface 412 being concave in a paraxial region thereof, which are both aspheric.

The second lens element 420 has positive refractive power in a paraxial region thereof and is made of plastic. The second lens element 420 has an object-side surface 421 being concave in a paraxial region thereof and an image-side surface 422 being convex in a paraxial region thereof, which are both aspheric.

The third lens element 430 has negative refractive power in a paraxial region thereof and is made of plastic. The third lens element 430 has an object-side surface 431 being concave in a paraxial region thereof and an image-side surface 432 being concave in a paraxial region thereof with at least one convex critical point in an off-axial region thereof, both of the object-side surface 431 and the image-side surface 432 being aspheric.

The fourth lens element 440 has positive refractive power in a paraxial region thereof and is made of plastic. The fourth lens element 440 has an object-side surface 441 being concave in a paraxial region thereof and an image-side surface 442 being convex in a paraxial region thereof, which are both aspheric.

The fifth lens element 450 has negative refractive power in a paraxial region thereof and is made of plastic. The fifth lens element 450 has an object-side surface 451 being convex in a paraxial region thereof and an image-side surface 452 being concave in a paraxial region thereof with at least one convex critical point in an off-axial region thereof, both of the object-side surface 451 and the image-side surface 452 being aspheric.

The photographing optical lens system further comprises an IR-cut filter 460 located between the fifth lens element 450 and the image surface 470. The IR-cut filter 460 is made of glass and does not affect the focal length of the photographing optical lens system. The image sensor 480 is disposed on or near the image surface 470.

The detailed optical data of the 4th embodiment are shown in TABLE 7, wherein the units of the curvature radius, the thickness and the focal length are expressed in mm, HFOV is half of the maximum field of view, and surfaces #0 to #16 refer to the surfaces in order from the object side to the image side. The aspheric surface data of the 4th embodiment are shown in TABLE 8, wherein k is the conic coefficient in the equation of the aspheric surface profiles, and A4-A16 refer to the 4th to 16th order aspheric coefficients.

TABLE 7

(4th Embodiment)
f = 4.17 mm, Fno = 2.45, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.477 | ASP | 0.510 | Plastic | 1.544 | 55.9 | 6.26 |
| 2 | | 8.442 | ASP | 0.242 | | | | |
| 3 | Ape. Stop | Plano | | 0.143 | | | | |
| 4 | Lens 2 | −6.647 | | 0.770 | Glass | 1.804 | 46.5 | 9.59 |
| 5 | | −3.755 | | 0.040 | | | | |
| 6 | Lens 3 | −49.674 | ASP | 0.970 | Plastic | 1.660 | 20.4 | −10.64 |
| 7 | | 8.242 | ASP | 0.346 | | | | |
| 8 | Lens 4 | −3.310 | ASP | 1.356 | Plastic | 1.544 | 55.9 | 4.56 |
| 9 | | −1.621 | ASP | 0.222 | | | | |
| 10 | Lens 5 | 3.265 | ASP | 1.120 | Plastic | 1.639 | 23.5 | −5.43 |
| 11 | | 1.456 | ASP | 0.800 | | | | |
| 12 | IR-filter | Plano | | 0.210 | Glass | 1.517 | 64.2 | — |
| 13 | | Plano | | 0.264 | | | | |
| 14 | Image | Plano | | — | | | | |

Note:
Reference wavelength is d-line 587.6 nm.

TABLE 8

| Aspheric Coefficients | | | | |
|---|---|---|---|---|
| Surface # | 1 | 2 | 6 | 7 |
| k = | 1.2828E+00 | −4.9816E+00 | −1.2795E+01 | 6.3345E+00 |
| A4 = | −8.8823E-03 | −4.8034E-03 | −4.6970E-02 | −1.8392E-02 |
| A6 = | −6.6797E-03 | −1.0018E-02 | −8.5488E-03 | −2.0364E-03 |
| A8 = | −7.1591E-04 | 2.3183E-04 | 4.3090E-04 | 1.8137E-04 |
| A10 = | −7.7695E-04 | −9.9628E-03 | −7.0653E-03 | −1.1053E-03 |
| A12 = | −2.5217E-03 | 3.4452E-03 | 5.5299E-04 | 1.6543E-04 |
| Surface # | 8 | 9 | 10 | 11 |
| k = | −9.1283E+00 | −1.0546E+00 | −3.8464E+01 | −4.0852E+00 |
| A4 = | −1.5353E-02 | −8.7797E-02 | −4.6276E-02 | −4.5743E-02 |
| A6 = | −1.1712E-02 | 1.0883E-01 | 1.3764E-03 | 1.3824E-02 |
| A8 = | 1.7702E-02 | −9.4654E-02 | 7.5885E-03 | −2.6807E-03 |
| A10 = | −7.1379E-03 | 5.2531E-02 | −3.8364E-03 | 3.1742E-04 |
| A12 = | 1.5363E-03 | −1.7763E-02 | 8.6654E-04 | −2.2735E-05 |
| A14 = | −1.4170E-04 | 3.3105E-03 | −9.6724E-05 | 9.0067E-07 |
| A16 = | | −2.5191E-04 | 4.3211E-06 | −1.5120E-08 |

In the 4th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 4th embodiment are as specified below.

| 4th Embodiment | | | |
|---|---|---|---|
| f [mm] | 4.17 | (R3 + R4)/(R3 − R4) | 3.60 |
| Fno | 2.45 | |R7 + R8|/f | 1.18 |
| HFOV [deg.] | 42.5 | f/R6 | 0.51 |
| 1/tan(HFOV) | 1.09 | f/SD52 | 1.23 |
| V4/V5 | 2.38 | f1/f2 | 0.65 |
| T12/T34 | 1.11 | f3/f5 | 1.96 |
| T23/CT3 | 0.04 | (f/f1) + (f/f2) | 1.10 |
| (R1 + R4)/(R1 − R4) | −0.20 | | |

5th Embodiment

Figure 5A:
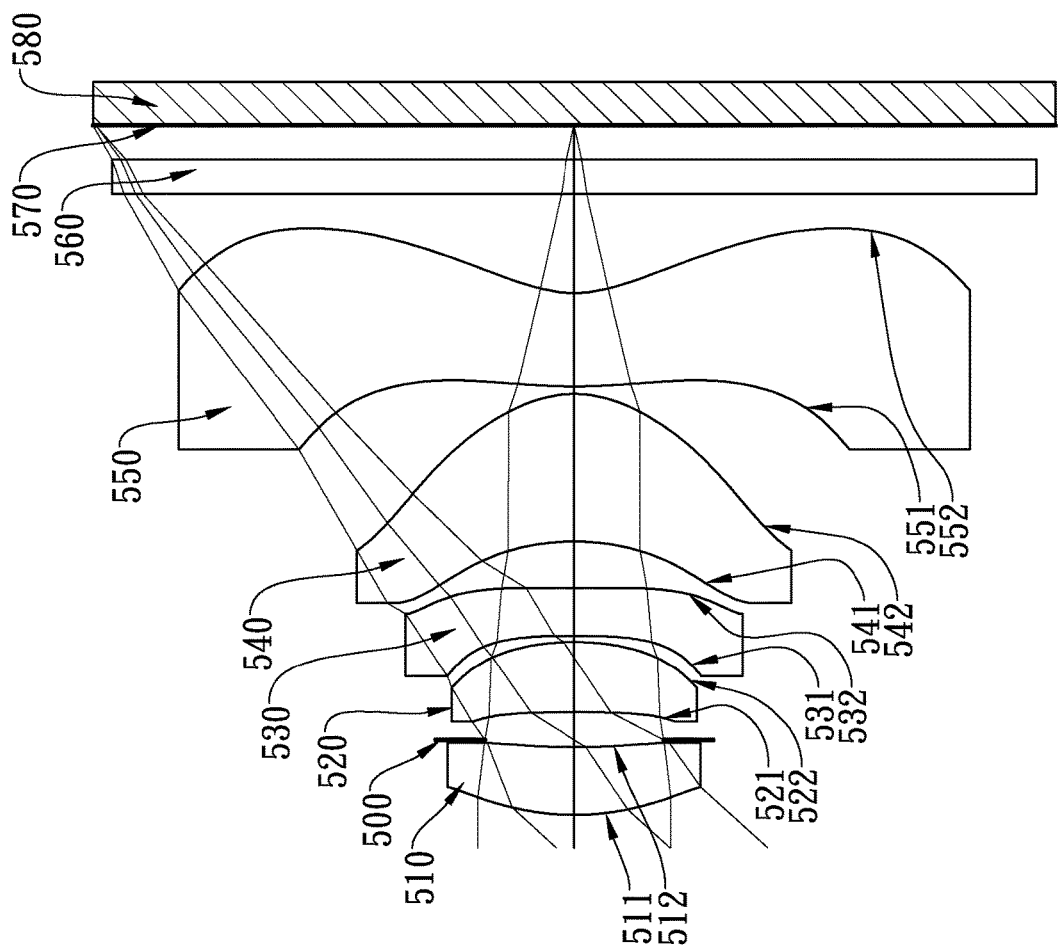
FIG. 5A is a schematic view of an imaging apparatus according to the 5th embodiment of the present disclosure.
Figure 5B:
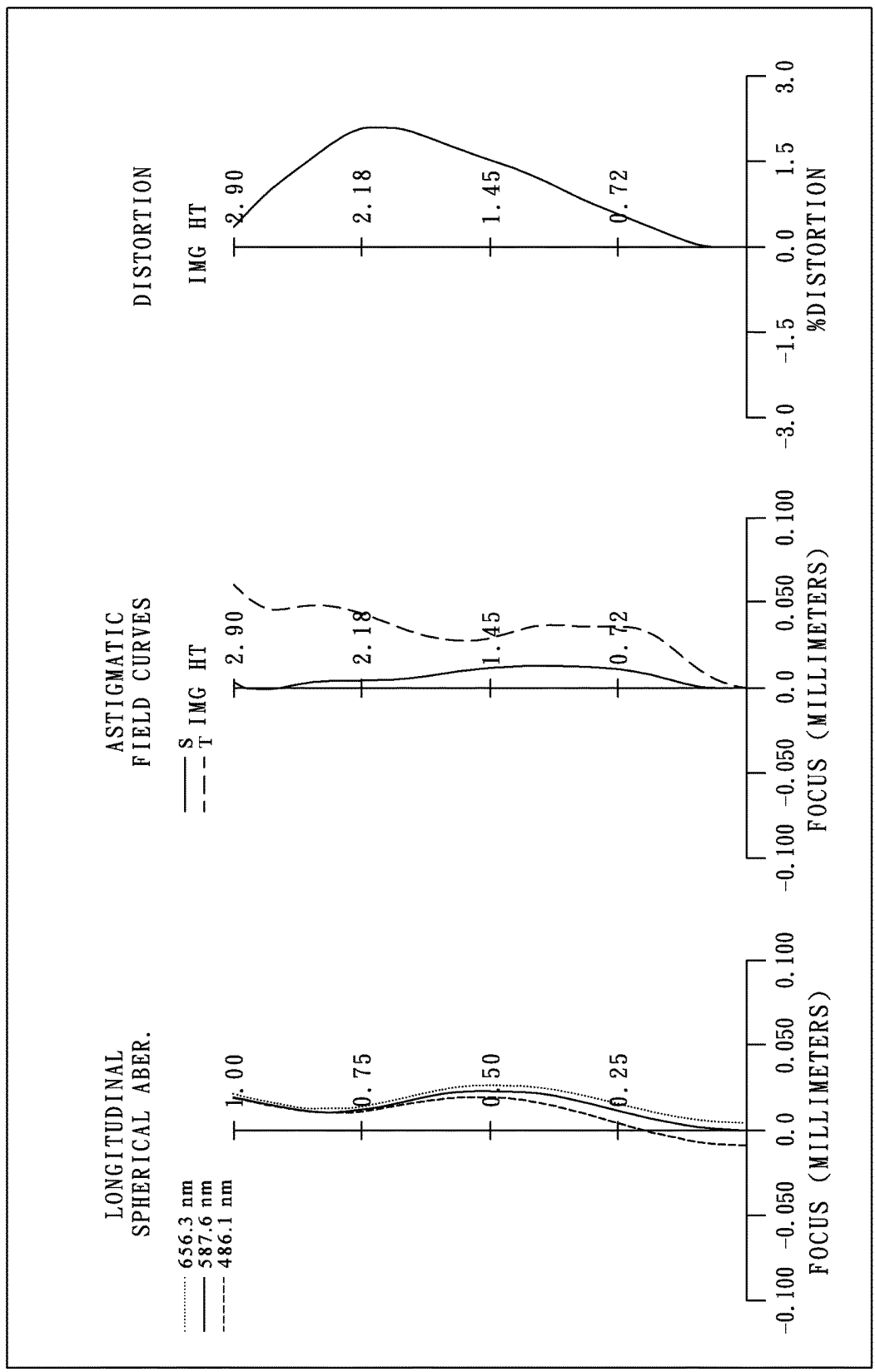
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus comprises a photographing optical lens system (not otherwise herein labeled) of the present disclosure and an image sensor 580. The photographing optical lens system comprises, in order from an object side to an image side, a first lens element 510, an aperture stop 500, a second lens element 520, a third lens element 530, a fourth lens element 540, a fifth lens element 550, an IR-cut filter 560 and an image surface 570, wherein the photographing optical lens system has a total of five lens elements (510, 520, 530, 540, 550).

The first lens element 510 has positive refractive power in a paraxial region thereof and is made of plastic. The first lens element 510 has an object-side surface 511 being convex in a paraxial region thereof and an image-side surface 512 being concave in a paraxial region thereof, which are both aspheric.

The second lens element 520 has positive refractive power in a paraxial region thereof and is made of plastic. The second lens element 520 has an object-side surface 521 being concave in a paraxial region thereof and an image-side surface 522 being convex in a paraxial region thereof, which are both aspheric.

The third lens element 530 has negative refractive power in a paraxial region thereof and is made of plastic. The third lens element 530 has an object-side surface 531 being concave in a paraxial region thereof and an image-side surface 532 being concave in a paraxial region thereof with at least one convex critical point in an off-axial region thereof, both of the object-side surface 531 and the image-side surface 532 being aspheric.

The fourth lens element 540 has positive refractive power in a paraxial region thereof and is made of plastic. The fourth lens element 540 has an object-side surface 541 being concave in a paraxial region thereof and an image-side surface 542 being convex in a paraxial region thereof, which are both aspheric.

The fifth lens element 550 has negative refractive power in a paraxial region thereof and is made of plastic. The fifth lens element 550 has an object-side surface 551 being convex in a paraxial region thereof and an image-side surface 552 being concave in a paraxial region thereof with at least one convex critical point in an off-axial region thereof, both of the object-side surface 551 and the image-side surface 552 being aspheric.

The photographing optical lens system further comprises an IR-cut filter 560 located between the fifth lens element 550 and the image surface 570. The IR-cut filter 560 is made of glass and does not affect the focal length of the photographing optical lens system. The image sensor 580 is disposed on or near the image surface 570.

The detailed optical data of the 5th embodiment are shown in TABLE 9, wherein the units of the curvature radius, the thickness and the focal length are expressed in mm, HFOV is half of the maximum field of view, and surfaces #0 to #16 refer to the surfaces in order from the object side to the image side. The aspheric surface data of the 5th embodiment are shown in TABLE 10, wherein k is the conic coefficient in the equation of the aspheric surface profiles, and A4-A16 refer to the 4th to 16th order aspheric coefficients.

TABLE 9

(5th Embodiment)
f = 2.64 mm, Fno = 2.25, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.599 | ASP | 0.410 | Plastic | 1.544 | 55.9 | 4.66 |
| 2 | | 3.945 | ASP | 0.046 | | | | |
| 3 | Ape. Stop | Plano | | 0.168 | | | | |
| 4 | Lens 2 | −8.423 | ASP | 0.427 | Plastic | 1.544 | 55.9 | 3.92 |
| 5 | | −1.731 | ASP | 0.038 | | | | |
| 6 | Lens 3 | −9.617 | ASP | 0.288 | Plastic | 1.660 | 20.4 | −7.29 |
| 7 | | 9.755 | ASP | 0.286 | | | | |
| 8 | Lens 4 | −1.446 | ASP | 0.895 | Plastic | 1.544 | 55.9 | 1.68 |
| 9 | | −0.683 | ASP | 0.045 | | | | |
| 10 | Lens 5 | 3.353 | ASP | 0.571 | Plastic | 1.580 | 35.1 | −1.76 |
| 11 | | 0.734 | ASP | 0.600 | | | | |
| 12 | IR-filter | Plano | | 0.210 | Glass | 1.517 | 64.2 | |
| 13 | | Plano | | 0.206 | | | | |
| 14 | Image | Plano | | — | | | | |

Note:
Reference wavelength is d-line 587.6 nm.

TABLE 10

Aspheric Coefficients

| Surface # | 1 | 2 | 4 | 5 | 6 |
|---|---|---|---|---|---|
| k = | 5.6816E−01 | −8.8815E+01 | −1.3651E+01 | 3.9113E−01 | 4.9983E+01 |
| A4 = | −3.1789E−02 | 1.1234E−01 | −1.2665E−01 | −4.2320E−01 | −6.9404E−01 |
| A6 = | −3.8803E−02 | −4.7820E−01 | −1.5521E−01 | 3.5705E−01 | 1.0680E+00 |
| A8 = | −2.9993E−03 | 1.3145E−01 | −8.3604E−02 | 1.2803E+00 | −3.3843E+00 |
| A10 = | −2.2061E−01 | −9.6545E−03 | −2.0529E+00 | −6.4127E+00 | 9.1147E+00 |
| A12 = | | | 2.9565E+00 | 6.1547E+00 | −1.8272E+01 |
| A14 = | | | | | 1.3836E+01 |

| Surface # | 7 | 8 | 9 | 10 | 11 |
|---|---|---|---|---|---|
| k = | −2.3891E+01 | −1.4673E−01 | −1.5745E+00 | −5.8149E+00 | −4.7737E+00 |
| A4 = | −2.7415E−01 | −7.9430E−02 | 2.1687E−01 | −1.4459E−01 | −8.3174E−02 |
| A6 = | 1.2349E−02 | 3.4096E−01 | −8.9576E−01 | 2.2401E−02 | 3.5100E−02 |
| A8 = | 2.1861E−01 | −1.9295E+00 | 1.6425E+00 | 7.1447E−03 | −1.2386E−02 |
| A10 = | −3.5417E−01 | 4.4606E+00 | −2.0494E+00 | −1.5047E−04 | 3.2811E−03 |

TABLE 10-continued

| Aspheric Coefficients | | | | | |
|---|---|---|---|---|---|
| A12 = | 1.4377E−01 | −4.6179E+00 | 1.5667E+00 | −2.8436E−03 | −6.1646E−04 |
| A14 = | 5.4273E−02 | 2.3204E+00 | −6.2240E−01 | 6.4937E−04 | 6.6035E−05 |
| A16 = | | −4.6289E−01 | 9.8032E−02 | | −2.9173E−06 |

In the 5th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 5th embodiment are as specified below.

| 5th Embodiment | | | |
|---|---|---|---|
| f [mm] | 2.64 | (R3 + R4)/(R3 − R4) | 1.52 |
| Fno | 2.25 | |R7 + R8|/f | 0.81 |
| HFOV [deg.] | 47.5 | f/R6 | 0.27 |
| 1/tan(HFOV) | 0.92 | f/SD52 | 1.10 |
| V4/V5 | 1.59 | f1/f2 | 1.19 |
| T12/T34 | 0.75 | f3/f5 | 1.14 |
| T23/CT3 | 0.13 | (f/f1) + (f/f2) | 1.24 |
| (R1 + R4)/(R1 − R4) | −0.04 | | |

6th Embodiment

Figure 6A:
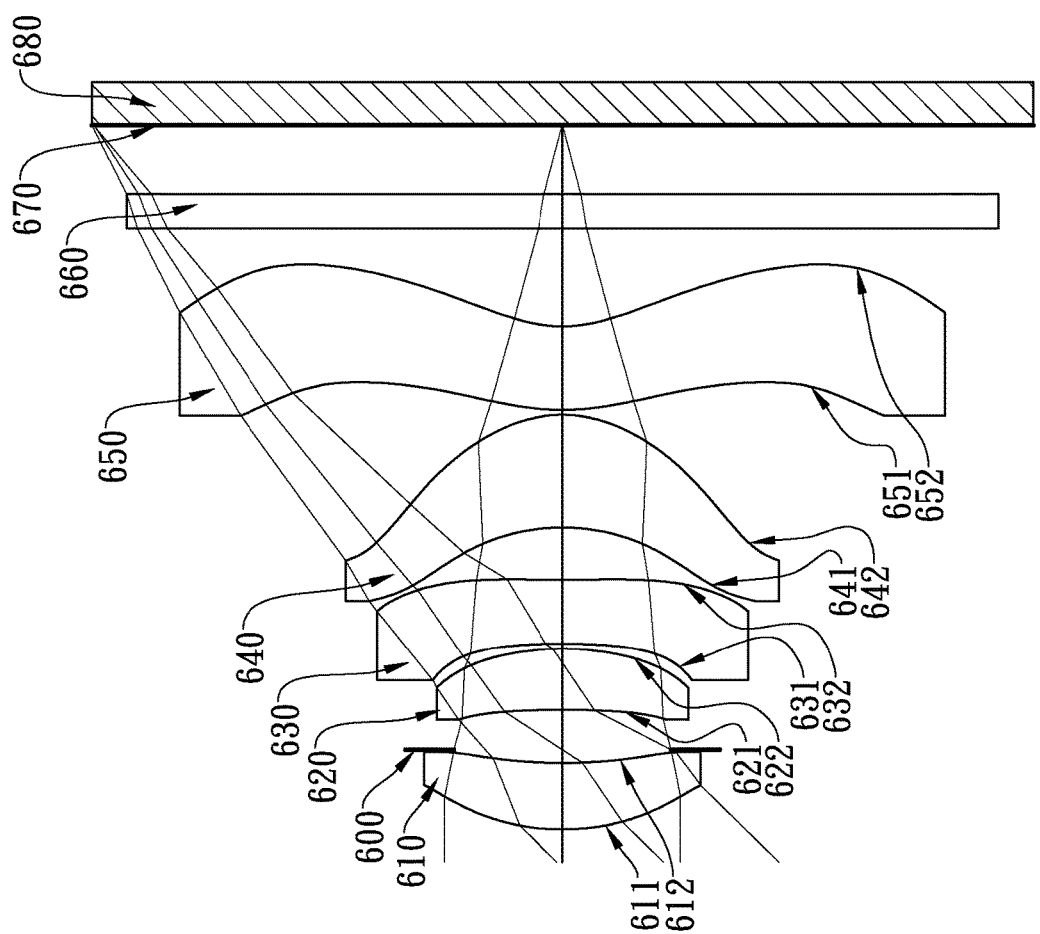
FIG. 6A is a schematic view of an imaging apparatus according to the 6th embodiment of the present disclosure.
Figure 6B:
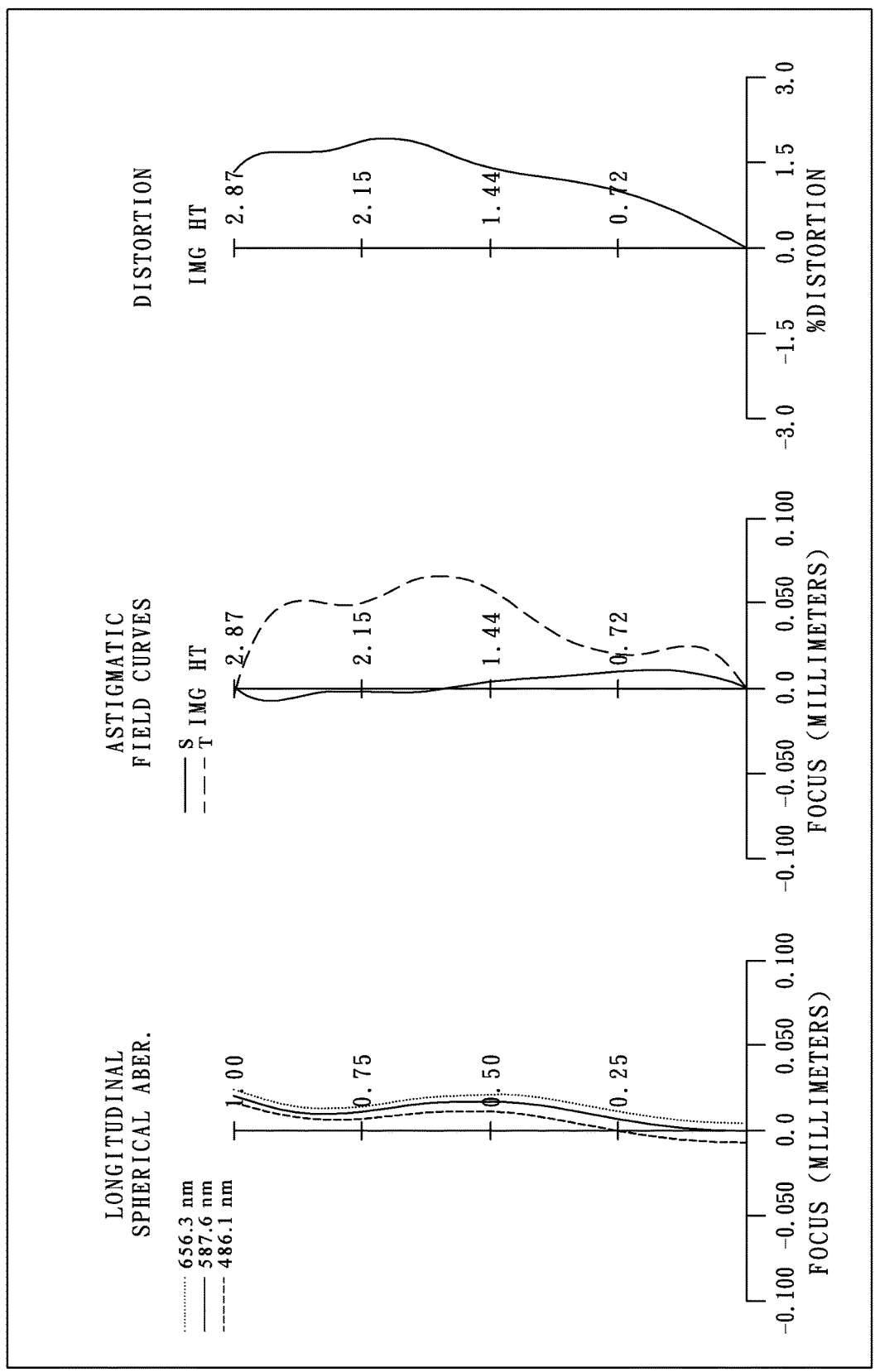
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus comprises a photographing optical lens system (not otherwise herein labeled) of the present disclosure and an image sensor 680. The photographing optical lens system comprises, in order from an object side to an image side, a first lens element 610, an aperture stop 600, a second lens element 620, a third lens element 630, a fourth lens element 640, a fifth lens element 650, an IR-cut filter 660 and an image surface 670, wherein the photographing optical lens system has a total of five lens elements (610, 620, 630, 640, 650).

The first lens element 610 has positive refractive power in a paraxial region thereof and is made of plastic. The first lens element 610 has an object-side surface 611 being convex in a paraxial region thereof and an image-side surface 612 being concave in a paraxial region thereof, which are both aspheric.

The second lens element 620 has positive refractive power in a paraxial region thereof and is made of plastic. The second lens element 620 has an object-side surface 621 being concave in a paraxial region thereof and an image-side surface 622 being convex in a paraxial region thereof, which are both aspheric.

The third lens element 630 has negative refractive power in a paraxial region thereof and is made of plastic. The third lens element 630 has an object-side surface 631 being concave in a paraxial region thereof and an image-side surface 632 being concave in a paraxial region thereof with at least one convex critical point in an off-axial region thereof, both of the object-side surface 631 and the image-side surface 632 being aspheric.

The fourth lens element 640 has positive refractive power in a paraxial region thereof and is made of plastic. The fourth lens element 640 has an object-side surface 641 being concave in a paraxial region thereof and an image-side surface 642 being convex in a paraxial region thereof, which are both aspheric.

The fifth lens element 650 has negative refractive power in a paraxial region thereof and is made of plastic. The fifth lens element 650 has an object-side surface 651 being convex in a paraxial region thereof and an image-side surface 652 being concave in a paraxial region thereof with at least one convex critical point in an off-axial region thereof, both of the object-side surface 651 and the image-side surface 652 being aspheric.

The photographing optical lens system further comprises an IR-cut filter 660 located between the fifth lens element 650 and the image surface 670. The IR-cut filter 660 is made of glass and does not affect the focal length of the photographing optical lens system. The image sensor 680 is disposed on or near the image surface 670.

The detailed optical data of the 6th embodiment are shown in TABLE 11, wherein the units of the curvature radius, the thickness and the focal length are expressed in mm, HFOV is half of the maximum field of view, and surfaces #0 to #16 refer to the surfaces in order from the object side to the image side. The aspheric surface data of the 6th embodiment are shown in TABLE 12, wherein k is the conic coefficient in the equation of the aspheric surface profiles, and A4-A16 refer to the 4th to 16th order aspheric coefficients.

TABLE 11

(6th Embodiment)
f = 2.79 mm, Fno = 1.93, HFOV = 45.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.412 | ASP | 0.407 | Plastic | 1.545 | 56.0 | 4.45 |
| 2 | | 3.042 | ASP | 0.082 | | | | |
| 3 | Ape. Stop | Plano | | 0.245 | | | | |
| 4 | Lens 2 | −5.919 | ASP | 0.375 | Plastic | 1.544 | 55.9 | 4.42 |
| 5 | | −1.747 | ASP | 0.030 | | | | |
| 6 | Lens 3 | −4.714 | ASP | 0.395 | Plastic | 1.660 | 20.4 | −5.36 |
| 7 | | 14.680 | ASP | 0.321 | | | | |

TABLE 11-continued (6th Embodiment)
f = 2.79 mm, Fno = 1.93, HFOV = 45.3 deg.

| Surface # | | Curvature Radius | | Thickness | Material | Index | Abbe # | Focal Length |
|---|---|---|---|---|---|---|---|---|
| 8 | Lens 4 | −1.216 | ASP | 0.690 | Plastic | 1.544 | 55.9 | 2.56 |
| 9 | | −0.778 | ASP | 0.030 | | | | |
| 10 | Lens 5 | 1.508 | ASP | 0.515 | Plastic | 1.639 | 23.5 | −3.75 |
| 11 | | 0.802 | ASP | 0.600 | | | | |
| 12 | IR-filter | Plano | | 0.210 | Glass | 1.517 | 64.2 | — |
| 13 | | Plano | | 0.423 | | | | |
| 14 | Image | Plano | | — | | | | |

Note:
Reference wavelength is d-line 587.6 nm.
The effective radius on surface #6 is 0.795 mm.

TABLE 12

Aspheric Coefficients

| Surface # | 1 | 2 | 4 | 5 | 6 |
|---|---|---|---|---|---|
| k = | 3.7084E−01 | −1.0134E+00 | 3.1118E+00 | −9.2942E−01 | 7.7598E−01 |
| A4 = | −1.2404E−02 | 2.0283E−03 | −6.6005E−02 | 3.3996E−02 | −1.2179E−01 |
| A6 = | 3.6269E−02 | 2.5562E−02 | 1.8568E−02 | −5.4069E−01 | −7.4487E−01 |
| A8 = | 8.1213E−02 | −3.6396E−01 | −1.2712E+00 | 4.7670E−01 | 2.5359E+00 |
| A10 = | −7.0530E−01 | 4.2258E−01 | 3.4126E+00 | −3.7416E−01 | −7.1801E+00 |
| A12 = | 1.3073E+00 | −6.0657E−01 | −5.6588E+00 | 3.0539E−02 | 1.0061E+01 |
| A14 = | −1.0107E+00 | | 3.1657E+00 | | −5.9478E+00 |

| Surface # | 7 | 8 | 9 | 10 | 11 |
|---|---|---|---|---|---|
| k = | 1.7560E+01 | −1.5367E+00 | −3.4508E+00 | −8.1444E−01 | −4.1946E+00 |
| A4 = | −1.7317E−01 | −1.2278E−02 | −4.5125E−01 | −2.8363E−01 | −1.1350E−01 |
| A6 = | 2.5088E−02 | −2.0978E−01 | 5.3082E−01 | 1.3111E−01 | 5.4596E−02 |
| A8 = | 6.0557E−02 | −5.8883E−01 | −6.9922E−01 | −2.7494E−02 | −1.6015E−02 |
| A10 = | −1.2245E−01 | 2.4686E+00 | 5.3292E−01 | −4.8692E−03 | 2.4212E−03 |
| A12 = | 1.0347E−01 | −2.7767E+00 | −1.5492E−01 | | −1.9607E−04 |
| A14 = | −3.5403E−02 | 1.3545E+00 | 6.7418E−03 | −5.1670E−04 | 1.0542E−05 |
| A16 = | | −2.5215E−01 | 1.7401E−03 | 2.6185E−05 | −4.2811E−07 |

In the 6th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 6th embodiment are as specified below.

| 6th Embodiment | | | |
|---|---|---|---|
| f [mm] | 2.79 | (R3 + R4)/(R3 − R4) | 1.84 |
| Fno | 1.93 | |R7 + R8|/f | 0.71 |
| HFOV [deg.] | 45.3 | f/R6 | 0.19 |
| 1/tan(HFOV) | 0.99 | f/SD52 | 1.19 |
| V4/V5 | 2.38 | f1/f2 | 1.01 |
| T12/T34 | 1.02 | f3/f5 | 1.43 |
| T23/CT3 | 0.08 | (f/f1) + (f/f2) | 1.26 |
| (R1 + R4)/(R1 − R4) | −0.11 | | |

7th Embodiment

Figure 7A:
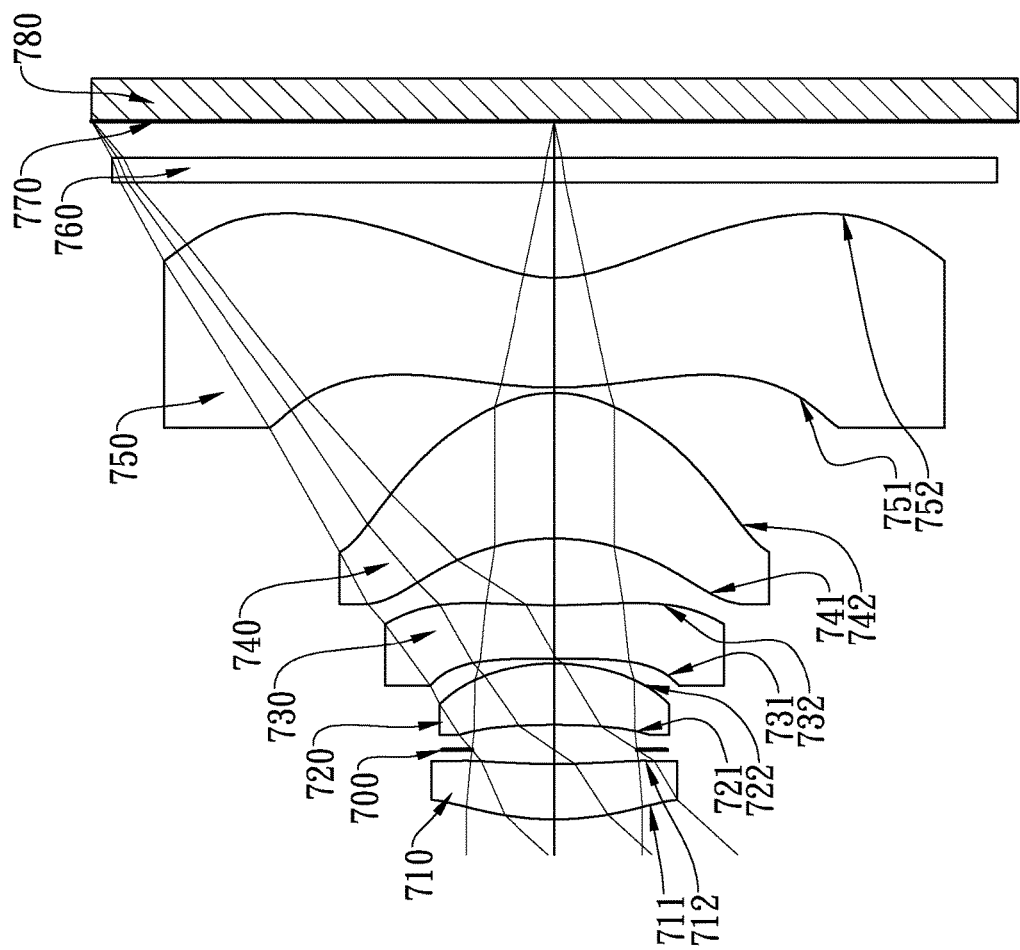
FIG. 7A is a schematic view of an imaging apparatus according to the 7th embodiment of the present disclosure.
Figure 7B:
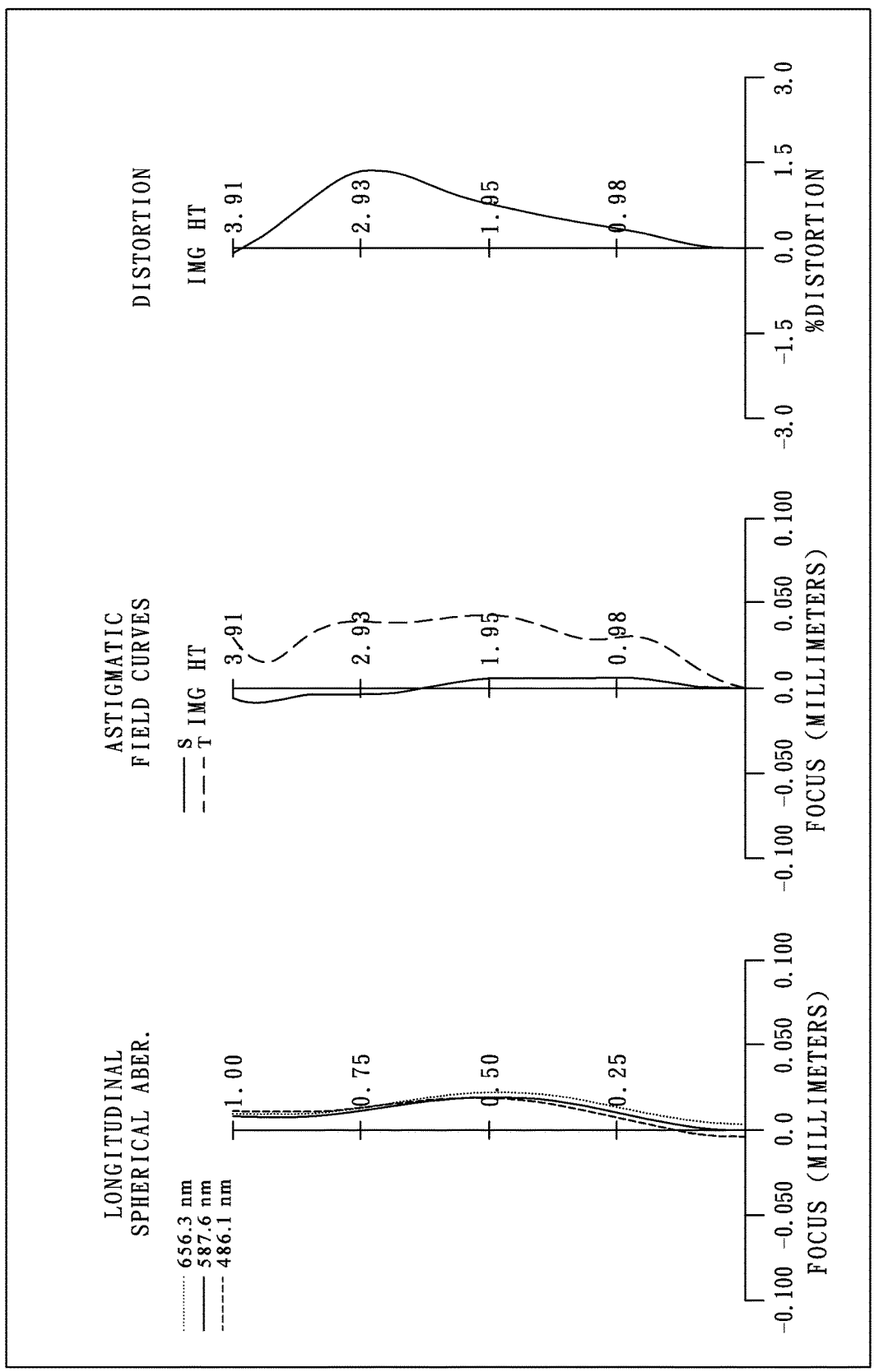
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus comprises a photographing optical lens system (not otherwise herein labeled) of the present disclosure and an image sensor 780. The photographing optical lens system comprises, in order from an object side to an image side, a first lens element 710, an aperture stop 700, a second lens element 720, a third lens element 730, a fourth lens element 740, a fifth lens element 750, an IR-cut filter 760 and an image surface 770, wherein the photographing optical lens system has a total of five lens elements (710, 720, 730, 740, 750).

The first lens element 710 has positive refractive power in a paraxial region thereof and is made of plastic. The first lens element 710 has an object-side surface 711 being convex in a paraxial region thereof and an image-side surface 712 being concave in a paraxial region thereof, which are both aspheric.

The second lens element 720 has positive refractive power in a paraxial region thereof and is made of plastic. The second lens element 720 has an object-side surface 721 being concave in a paraxial region thereof and an image-side surface 722 being convex in a paraxial region thereof, which are both aspheric.

The third lens element 730 has negative refractive power in a paraxial region thereof and is made of plastic. The third lens element 730 has an object-side surface 731 being concave in a paraxial region thereof and an image-side surface 732 being concave in a paraxial region thereof with at least one convex critical point in an off-axial region thereof, both of the object-side surface 731 and the image-side surface 732 being aspheric.

The fourth lens element 740 has positive refractive power in a paraxial region thereof and is made of plastic. The fourth lens element 740 has an object-side surface 741 being concave in a paraxial region thereof and an image-side surface 742 being convex in a paraxial region thereof, which are both aspheric.

The fifth lens element 750 has negative refractive power in a paraxial region thereof and is made of plastic. The fifth lens element 750 has an object-side surface 751 being convex in a paraxial region thereof and an image-side surface 752 being concave in a paraxial region thereof with at least one convex critical point in an off-axial region thereof, both of the object-side surface 751 and the image-side surface 752 being aspheric.

The photographing optical lens system further comprises an IR-cut filter 760 located between the fifth lens element 750 and the image surface 770. The IR-cut filter 760 is made of glass and does not affect the focal length of the photographing optical lens system. The image sensor 780 is disposed on or near the image surface 770.

The detailed optical data of the 7th embodiment are shown in TABLE 13, wherein the units of the curvature radius, the thickness and the focal length are expressed in mm, HFOV is half of the maximum field of view, and surfaces #0 to #16 refer to the surfaces in order from the object side to the image side. The aspheric surface data of the 7th embodiment are shown in TABLE 14, wherein k is the conic coefficient in the equation of the aspheric surface profiles, and A4-A16 refer to the 4th to 16th order aspheric coefficients.

TABLE 13

(7th Embodiment)
f = 3.57 mm, Fno = 2.40, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.482 | ASP | 0.466 | Plastic | 1.544 | 56.0 | 7.38 |
| 2 | | 6.069 | ASP | 0.120 | | | | |
| 3 | Ape. Stop | Plano | | 0.211 | | | | |
| 4 | Lens 2 | −6.011 | ASP | 0.517 | Plastic | 1.514 | 56.8 | 4.89 |
| 5 | | −1.822 | ASP | 0.040 | | | | |
| 6 | Lens 3 | −100.000 | ASP | 0.457 | Plastic | 1.660 | 20.4 | −8.88 |
| 7 | | 6.233 | ASP | 0.563 | | | | |
| 8 | Lens 4 | −1.884 | ASP | 1.228 | Plastic | 1.544 | 56.0 | 2.75 |
| 9 | | −1.025 | ASP | 0.045 | | | | |
| 10 | Lens 5 | 3.582 | ASP | 0.931 | Plastic | 1.639 | 23.5 | −3.11 |
| 11 | | 1.147 | ASP | 0.800 | | | | |
| 12 | IR-filter | Plano | | 0.210 | Glass | 1.517 | 64.2 | — |
| 13 | | Plano | | 0.308 | | | | |
| 14 | Image | Plano | | — | | | | |

Note:
Reference wavelength is d-line 587.6 nm.

TABLE 14

Aspheric Coefficients

| Surface # | 1 | 2 | 4 | 5 | 6 |
|---|---|---|---|---|---|
| k = | −2.9704E+00 | −7.0124E+01 | −1.8737E+01 | −4.5431E−01 | −9.0000E+01 |
| A4 = | 6.1591E−03 | 4.8147E−03 | −5.0512E−02 | −5.1638E−02 | −1.5234E−01 |
| A6 = | −1.3120E−02 | −5.7585E−02 | 3.2492E−02 | −3.1415E−02 | 5.1472E−02 |
| A8 = | −3.6253E−03 | −3.2759E−02 | −3.9496E−01 | 1.4226E−01 | −7.9267E−02 |
| A10 = | −2.6792E−02 | 2.4504E−02 | 9.5664E−01 | −2.9508E−01 | 4.8961E−02 |
| A12 = | 1.1137E−02 | 6.5841E−03 | −1.3244E+00 | 1.5176E−01 | −5.8112E−02 |
| A14 = | | | 7.4507E−01 | | 1.7785E−02 |

| Surface # | 7 | 8 | 9 | 10 | 11 |
|---|---|---|---|---|---|
| k = | −2.7254E+01 | −1.4992E−01 | −1.4367E+00 | −4.2051E−01 | −4.8612E+00 |
| A4 = | −8.1687E−02 | 9.3388E−03 | 4.8028E−02 | −5.5800E−02 | −2.3923E−02 |
| A6 = | 1.0983E−02 | 2.6294E−02 | −8.5821E−02 | 6.9414E−03 | 3.5015E−03 |
| A8 = | 8.6757E−04 | −8.2433E−02 | 5.9596E−02 | −1.7818E−03 | −4.2243E−04 |
| A10 = | −4.9529E−03 | 8.1864E−02 | −2.8535E−02 | 6.7741E−04 | 4.6542E−05 |
| A12 = | 1.6482E−03 | −3.3892E−02 | 7.4965E−03 | −1.4667E−04 | −5.2106E−06 |
| A14 = | | 6.8015E−03 | −7.2721E−04 | 1.1137E−05 | 3.3392E−07 |
| A16 = | | −5.6587E−04 | | | −7.6775E−09 |

In the 7th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 7th embodiment are as specified below.

| | 7th Embodiment | | |
|---|---|---|---|
| f [mm] | 3.57 | (R3 + R4)/(R3 − R4) | 1.87 |
| Fno | 2.40 | |R7 + R8|/f | 0.81 |
| HFOV [deg.] | 47.5 | f/R6 | 0.57 |
| 1/tan(HFOV) | 0.92 | f/SD52 | 1.08 |
| V4/V5 | 2.38 | f1/f2 | 1.51 |
| T12/T34 | 0.59 | f3/f5 | 2.86 |
| T23/CT3 | 0.09 | (f/f1) + (f/f2) | 1.21 |
| (R1 + R4)/(R1 − R4) | 0.15 | | |

8th Embodiment

Figure 8A:
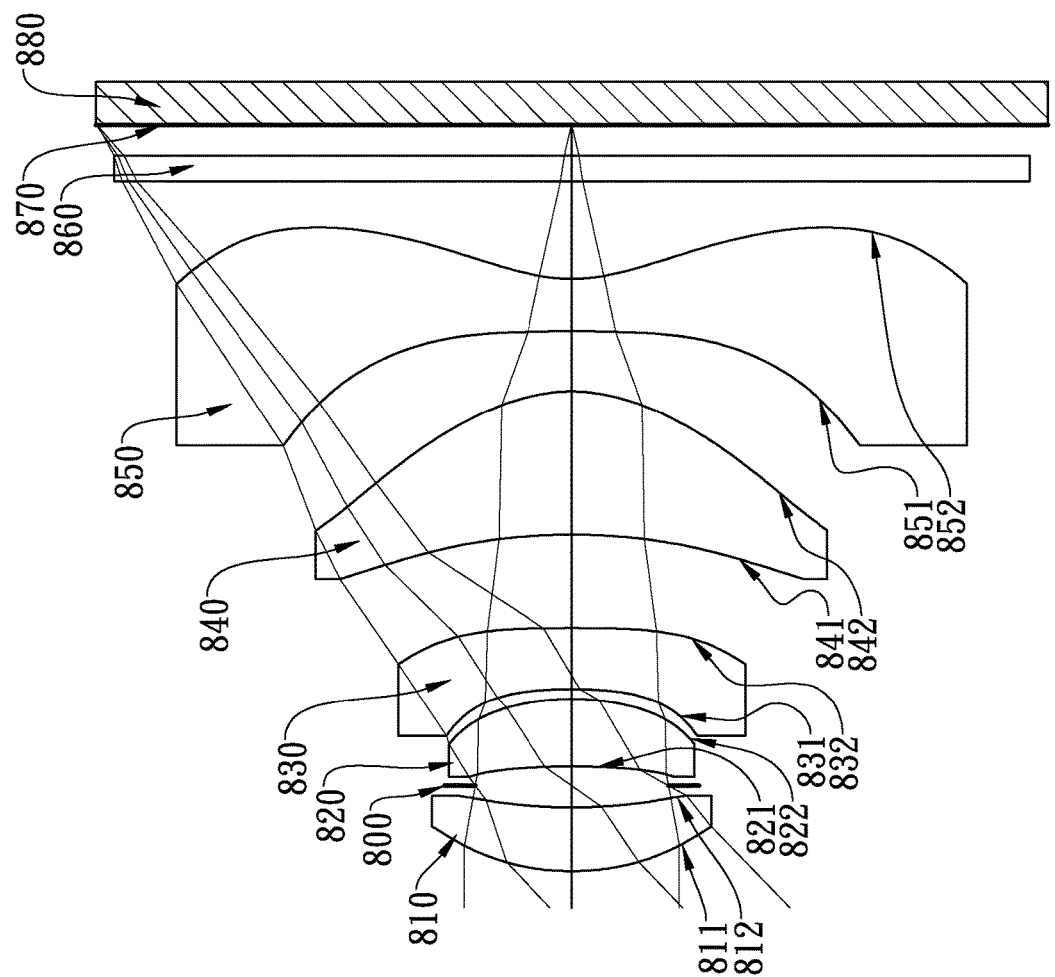
FIG. 8A is a schematic view of an imaging apparatus according to the 8th embodiment of the present disclosure.
Figure 8B:
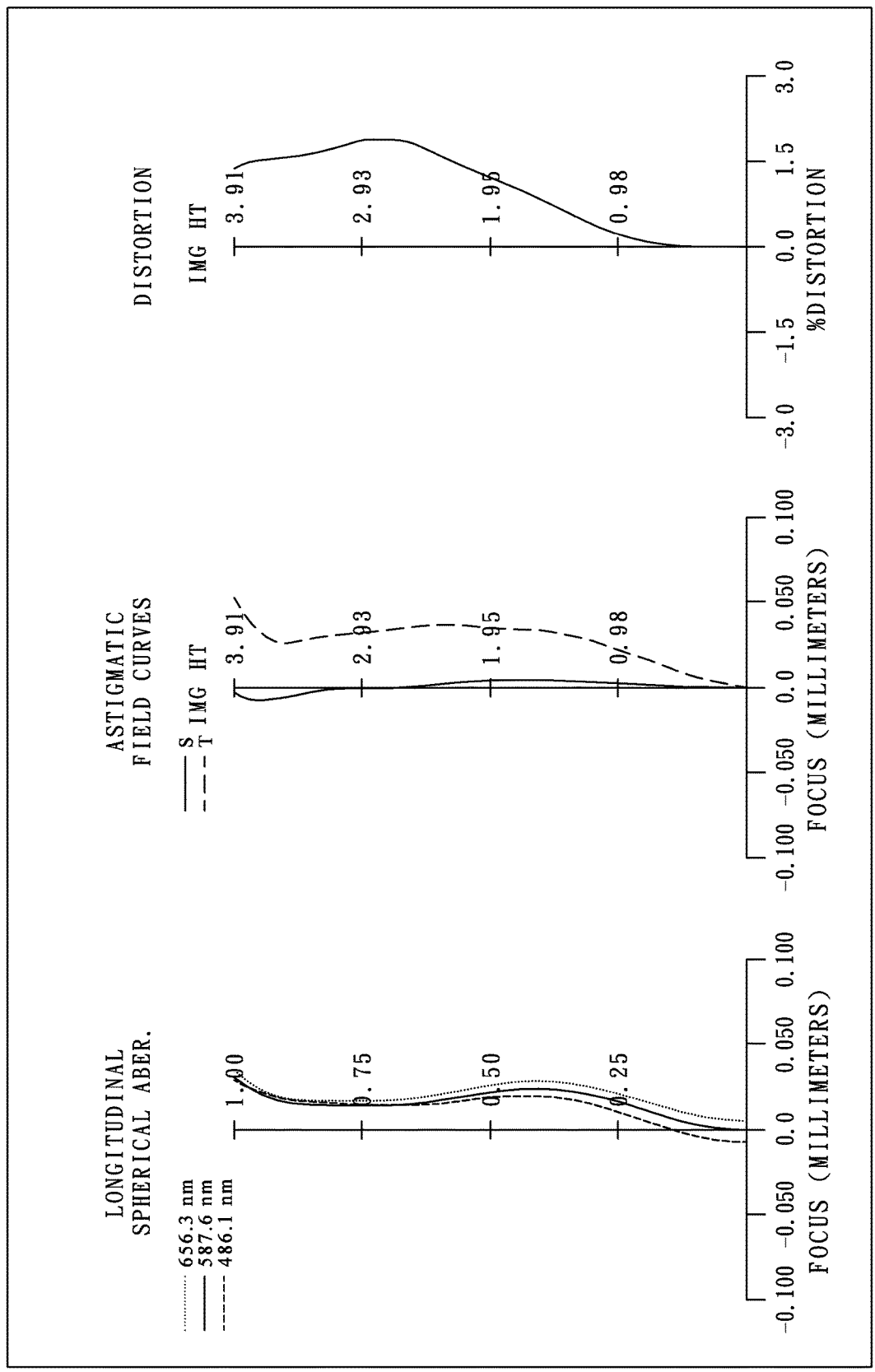
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus comprises a photographing optical lens system (not otherwise herein labeled) of the present disclosure and an image sensor 880. The photographing optical lens system comprises, in order from an object side to an image side, a first lens element 810, an aperture stop 800, a second lens element 820, a third lens element 830, a fourth lens element 840, a fifth lens element 850, an IR-cut filter 860 and an image surface 870, wherein the photographing optical lens system has a total of five lens elements (810, 820, 830, 840, 850).

The first lens element 810 has positive refractive power in a paraxial region thereof and is made of plastic. The first lens element 810 has an object-side surface 811 being convex in a paraxial region thereof and an image-side surface 812 being concave in a paraxial region thereof, which are both aspheric.

The second lens element 820 has positive refractive power in a paraxial region thereof and is made of plastic. The second lens element 820 has an object-side surface 821 being concave in a paraxial region thereof and an image-side surface 822 being convex in a paraxial region thereof, which are both aspheric.

The third lens element 830 has negative refractive power in a paraxial region thereof and is made of plastic. The third lens element 830 has an object-side surface 831 being concave in a paraxial region thereof and an image-side surface 832 being convex in a paraxial region thereof, which are both aspheric.

The fourth lens element 840 has positive refractive power in a paraxial region thereof and is made of glass. The fourth lens element 840 has an object-side surface 841 being concave in a paraxial region thereof and an image-side surface 842 being convex in a paraxial region thereof, which are both aspheric.

The fifth lens element 850 has negative refractive power in a paraxial region thereof and is made of plastic. The fifth lens element 850 has an object-side surface 851 being concave in a paraxial region thereof and an image-side surface 852 being concave in a paraxial region thereof with at least one convex critical point in an off-axial region thereof, both of the object-side surface 851 and the image-side surface 852 being aspheric.

The photographing optical lens system further comprises an IR-cut filter 860 located between the fifth lens element 850 and the image surface 870. The IR-cut filter 860 is made of glass and does not affect the focal length of the photographing optical lens system. The image sensor 880 is disposed on or near the image surface 870.

The detailed optical data of the 8th embodiment are shown in TABLE 15, wherein the units of the curvature radius, the thickness and the focal length are expressed in mm, HFOV is half of the maximum field of view, and surfaces #0 to #16 refer to the surfaces in order from the object side to the image side. The aspheric surface data of the 8th embodiment are shown in TABLE 16, wherein k is the conic coefficient in the equation of the aspheric surface profiles, and A4-A16 refer to the 4th to 16th order aspheric coefficients.

TABLE 15

(8th Embodiment)
f = 3.97 mm, Fno = 2.25, HFOV = 44.0 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.036 | ASP | 0.523 | Plastic | 1.545 | 56.1 | 6.48 |
| 2 | | 4.370 | ASP | 0.180 | | | | |
| 3 | Ape. Stop | Plano | | 0.158 | | | | |
| 4 | Lens 2 | −6.213 | ASP | 0.555 | Plastic | 1.544 | 56.0 | 6.12 |
| 5 | | −2.236 | ASP | 0.082 | | | | |
| 6 | Lens 3 | −3.784 | ASP | 0.502 | Plastic | 1.650 | 21.5 | −6.97 |
| 7 | | −24.118 | ASP | 0.768 | | | | |
| 8 | Lens 4 | −5.085 | ASP | 1.179 | Glass | 1.755 | 45.6 | 2.21 |
| 9 | | −1.382 | ASP | 0.496 | | | | |
| 10 | Lens 5 | −16.578 | ASP | 0.430 | Plastic | 1.584 | 28.2 | −2.15 |
| 11 | | 1.371 | ASP | 0.800 | | | | |
| 12 | IR-filter | Plano | | 0.210 | Glass | 1.517 | 64.2 | — |
| 13 | | Plano | | 0.254 | | | | |
| 14 | Image | Plano | | — | | | | |

Note:
Reference wavelength is d-line 587.6 nm.

TABLE 16

| | Aspheric Coefficients | | | | |
|---|---|---|---|---|---|
| Surface # | 1 | 2 | 4 | 5 | 6 |
| k = | −4.8308E−02 | 2.8586E+00 | −9.9000E+01 | 1.5422E+00 | −1.1636E+00 |
| A4 = | 9.9720E−03 | 1.3411E−02 | −7.6763E−02 | −5.0645E−02 | −1.6715E−01 |
| A6 = | 1.9440E−02 | −3.2214E−02 | 8.1133E−02 | −3.4943E−02 | 1.8886E−02 |
| A8 = | −3.0563E−02 | 5.8355E−02 | −2.0987E−02 | 1.4311E−01 | −3.6048E−02 |
| A10 = | 3.1645E−02 | −9.2523E−02 | 1.7131E−01 | −3.6756E−01 | −6.0721E−02 |
| A12 = | −1.5470E−02 | 3.7013E−02 | −2.5944E−02 | 3.2501E−01 | 3.4360E−02 |
| A14 = | | | −9.3034E−02 | −1.1395E−01 | |

| Surface # | 7 | 8 | 9 | 10 | 11 |
|---|---|---|---|---|---|
| k = | −4.2930E+01 | −2.9647E−08 | −3.4792E+00 | −7.9788E+00 | −5.3853E+00 |
| A4 = | −7.9335E−02 | −7.0640E−03 | −3.5228E−02 | −1.8128E−02 | −3.0334E−02 |
| A6 = | 2.2820E−02 | 2.0737E−03 | 5.0241E−03 | −1.6801E−02 | 4.8831E−03 |
| A8 = | −1.8083E−02 | | | 9.8244E−03 | −3.6304E−04 |
| A10 = | 8.2992E−03 | | | −2.4593E−03 | −1.6174E−05 |
| A12 = | −2.0737E−03 | | | 2.8364E−04 | 3.3686E−06 |
| A14 = | 3.3375E−04 | | | −1.2274E−05 | −1.0832E−07 |
| A16 = | | | | | −8.1728E−10 |

In the 8th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 8th embodiment are as specified below.

| 8th Embodiment | | | |
|---|---|---|---|
| f [mm] | 3.97 | (R3 + R4)/(R3 − R4) | 2.12 |
| Fno | 2.25 | |R7 + R8|/f | 1.63 |
| HFOV [deg.] | 44.0 | f/R6 | −0.16 |
| 1/tan(HFOV) | 1.04 | f/SD52 | 1.22 |
| V4/V5 | 1.62 | f1/f2 | 1.06 |
| T12/T34 | 0.44 | f3/f5 | 3.24 |
| T23/CT3 | 0.16 | (f/f1) + (f/f2) | 1.26 |
| (R1 + R4)/(R1 − R4) | −0.05 | | |

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising five lens elements, the five lens element being, in order from an object side to an image side:
   a first lens element with positive refractive power having an object-side surface being convex in a paraxial region thereof;
   a second lens element having positive refractive power;
   a third lens element having negative refractive power;
   a fourth lens element having positive refractive power; and
   a fifth lens element with negative refractive power having an image-side surface being concave in a paraxial region thereof with at least one convex critical point in an off-axial region thereof, both of an object-side surface and the image-side surface thereof being aspheric; and
   wherein an Abbe number of the fourth lens element is V4, an Abbe number of the fifth lens element is V5, a focal length of the photographing optical lens system is f, a curvature radius of an object-side surface of the second lens element is R3, a curvature radius of an image-side surface of the second lens element is R4, a curvature radius of an image-side surface of the third lens element is R6, a focal length of the first lens element is f1, a focal length of the second lens element is f2, a focal length of the third lens element is f3, a focal length of the fifth lens element is f5, and the following conditions are satisfied:

$$1.50 < V4/V5;$$

$$-3.0 < f/R6 < 1.33;$$

$$0.65 < f3/f5 < 6.25;$$

$$0 < f1/f2 < 1.70; \text{ and}$$

$$0 < (R3+R4)/(R3-R4) < 5.5.$$

2. The photographing optical lens system of claim 1, wherein the fourth lens element has an object-side surface being concave in a paraxial region thereof and an image-side surface being convex in a paraxial region thereof.

3. The photographing optical lens system of claim 2, wherein the focal length of the photographing optical lens system is f, the focal length of the first lens element is f1, the focal length of the second lens element is f2, and the following condition is satisfied:

$$1.00 < (f/f1) + (f/f2) < 1.75.$$

4. The photographing optical lens system of claim 2, wherein the focal length of the photographing optical lens system is f, the curvature radius of the image-side surface of the third lens element is R6, and the following condition is satisfied:

$$-1.0 < f/R6 < 0.50.$$

5. The photographing optical lens system of claim 1, wherein the focal length of the photographing optical lens system is f, a curvature radius of an object-side surface of the fourth lens element is R7, a curvature radius of an image-side surface of the fourth lens element is R8, and the following condition is satisfied:

$0.40<|R7+R8|/f<1.25.$

6. The photographing optical lens system of claim 1, wherein an axial distance between the second lens element and the third lens element is T23, a central thickness of the third lens element is CT3, and the following condition is satisfied:

$T23/CT3<0.33.$

7. The photographing optical lens system of claim 1, wherein the third lens element has an image-side surface being concave in a paraxial region thereof with at least one convex critical point in an off-axial region thereof.

8. The photographing optical lens system of claim 1, wherein a curvature radius of the object-side surface of the first lens element is R1, the curvature radius of the image-side surface of the second lens element is R4, and the following condition is satisfied:

$-0.25<(R1+R4)/(R1-R4)<0.25.$

9. The photographing optical lens system of claim 1, wherein the Abbe number of the fourth lens element is V4, the Abbe number of the fifth lens element is V5, and the following condition is satisfied:

$2.0<V4/V5<3.5.$

10. The photographing optical lens system of claim 9, wherein the curvature radius of the object-side surface of the second lens element is R3, the curvature radius of the image-side surface of the second lens element is R4, and the following condition is satisfied:

$1.30<(R3+R4)/(R3-R4)<5.0.$

11. The photographing optical lens system of claim 9, wherein the focal length of the first lens element is f1, the focal length of the second lens element is f2, and the following condition is satisfied:

$0<f1/f2<1.25.$

12. The photographing optical lens system of claim 9, wherein an axial distance between the first lens element and the second lens element is T12, an axial distance between the third lens element and the fourth lens element is T34, and the following condition is satisfied:

$0<T12/T34<3.0.$

13. The photographing optical lens system of claim 9, wherein the third lens element has an image-side surface being concave in a paraxial region thereof.

14. The photographing optical lens system of claim 1, wherein an axial distance between the first lens element and the second lens element is T12, an axial distance between the third lens element and the fourth lens element is T34, and the following condition is satisfied:

$0.20<T12/T34<2.0.$

15. The photographing optical lens system of claim 1, wherein the focal length of the third lens element is f3, the focal length of the fifth lens element is f5, and the following condition is satisfied:

$1.0<f3/f5<4.5.$

16. The photographing optical lens system of claim 1, wherein there is at least one lens element made of glass among the second through fourth lens elements.

17. The photographing optical lens system of claim 1, wherein half of a maximum field of view of the photographing optical lens system is HFOV, and the following condition is satisfied:

$0.50<1/\tan(HFOV)<1.15.$

18. The photographing optical lens system of claim 1, wherein the focal length of the photographing optical lens system is f, a maximum effective radius of the image-side surface of the fifth lens element is SD52, and the following condition is satisfied:

$0.75<f/SD52<1.25.$

19. The photographing optical lens system of claim 1, wherein the second lens element has the object-side surface being concave in a paraxial region and the image-side surface being convex in a paraxial region, the curvature radius of the object-side surface of the second lens element is R3, the curvature radius of the image-side surface of the second lens element is R4, and the following condition is satisfied:

$1.0<(R3+R4)/(R3-R4)<5.5.$

20. An imaging apparatus comprising the photographing optical lens system of claim 1 and an image sensor.

21. An electronic device comprising the imaging apparatus of claim 20.

* * * * *